(12) United States Patent
Banerjee et al.

(10) Patent No.: US 11,961,187 B2
(45) Date of Patent: Apr. 16, 2024

(54) RECONSTRUCTION METHOD OF ORGAN VESSEL CENTERLINE

(71) Applicant: Oxford University Innovation Limited, Oxford (GB)

(72) Inventors: Abhirup Banerjee, Headington (GB); Robin P. Choudhury, Headington (GB); Vicente Grau, Oxford (GB)

(73) Assignee: OXFORD UNIVERSITY INNOVATION LIMITED, Oxford (GB)

( * ) Notice: Subject to any disclaimer, the term of this patent is extended or adjusted under 35 U.S.C. 154(b) by 351 days.

(21) Appl. No.: 17/296,277

(22) PCT Filed: Nov. 29, 2019

(86) PCT No.: PCT/GB2019/053380
§ 371 (c)(1),
(2) Date: May 24, 2021

(87) PCT Pub. No.: WO2020/109813
PCT Pub. Date: Jun. 4, 2020

(65) Prior Publication Data
US 2022/0020215 A1 Jan. 20, 2022

(30) Foreign Application Priority Data
Nov. 30, 2018 (GB) .................................... 1819596

(51) Int. Cl.
*G06T 17/30* (2006.01)
*G06T 3/00* (2006.01)
(Continued)

(52) U.S. Cl.
CPC ............ *G06T 17/30* (2013.01); *G06T 3/0093* (2013.01); *G06T 7/0012* (2013.01); *G06T 7/55* (2017.01);
(Continued)

(58) Field of Classification Search
None
See application file for complete search history.

(56) References Cited

U.S. PATENT DOCUMENTS 5,848,115 A * 12/1998 Little .................. G06T 17/00
382/152
7,379,062 B2 * 5/2008 Poole ................... G06T 7/60
600/431

(Continued)

FOREIGN PATENT DOCUMENTS

CN 107044821 A 8/2017
WO 2009/007910 A1 1/2009

OTHER PUBLICATIONS

International Search Report and Written Opinion for WO 2020/109813 (PCT/GB2019/053380), dated Jan. 28, 2020, pp. 1-17.
(Continued)

*Primary Examiner* — Jason A Pringle-Parker
(74) *Attorney, Agent, or Firm* — Thomas|Horstemeyer, LLP

(57) ABSTRACT

The present invention relates to a method of producing a 3D centerline of an organ vessel from a plurality of 2D x-ray images. The method comprises the steps of producing a point-cloud of 3D points which represent intersecting and non-intersecting points between projection lines from the 2D images to their respective x-ray sources; fitting a compound curve to the points in the point-cloud of 3D points; removing outliers from the point-cloud; fitting a new compound curve to the remaining points in the point-cloud of 3D points; and repeating certain steps, wherein the resultant compound curve represents the 3D centerline of the organ vessel. The method minimizes reconstruction errors and produces an optimally-reconstructed 3D vessel skeleton.

20 Claims, 18 Drawing Sheets

(51) Int. Cl.
   *G06T 7/00*      (2017.01)
   *G06T 7/55*      (2017.01)
(52) U.S. Cl.
   CPC ............... *G06T 2207/10028* (2013.01); *G06T 2207/10121* (2013.01); *G06T 2207/30101* (2013.01); *G06T 2207/30172* (2013.01)

(56) References Cited

U.S. PATENT DOCUMENTS

| | | | | |
|---|---|---|---|---|
| 2006/0069527 A1* | 3/2006 | Numata | ................... | G06T 17/10 |
| | | | | 702/168 |
| 2006/0250386 A1 | 11/2006 | Movassaghi et al. | | |
| 2007/0124107 A1* | 5/2007 | Numata | ..................... | G06T 7/55 |
| | | | | 702/168 |
| 2011/0206248 A1* | 8/2011 | Ruijters | ..................... | G06T 7/66 |
| | | | | 382/128 |
| 2017/0018116 A1* | 1/2017 | Sun | ......................... | A61B 6/541 |

OTHER PUBLICATIONS

UK Search Report for GB 1819596.6, dated May 28, 2019, pp. 1-3.
Sprague Kevin et al: "Coronary x-ray angiographic reconstruction and image orientation", Medical Physics, AIP, Melville, NY, us, vol. 33, No. 3, Feb. 22, 2006 (Feb. 22, 2006), pp. 707-718.
Grass Met Al: "A Quantitative Analysis of 3-D Coronary Modeling From Two or More Projection Images", IEEE Transactions on Medical Imaging, IEEE Service Center, Piscataway, NJ, US, vol. 23. no. 12, Dec. 1, 2004 (Dec. 1, 2004), pp. 1517-1531.
Van Than Dung et al: "A direct method to solve optimal knots of B-spline curves: An application for non-uniform B-spline curves fitting", PLOS One, vol. 12, No. 3, Mar. 20, 2017 (Mar. 20, 2017), p. e0173857.
Francesca Galassi et al: "3D reconstruction of coronary arteries from 2D angiographic projections using non-uniform rational basis splines (NURBS) for accurate modelling of coronary stenoses", PLOS One, vol. 13, No. 1, Jan. 3, 2018 (Jan. 3, 2018), p. e0190650.
Movassaghi Bet Al: "3D coronary reconstruction from calibrated motion-compensated 2D projections based on semi-automated feature point detection", Visual Communications and Image Processing; Jan. 20, 2004-Jan. 20, 2004; San Jose, vol. 5370, No. 1, Feb. 16, 2004 (Feb. 16, 2004), pp. 1943-1950.
Abhirup Banerjee, Francesca Galassi, Ernesto Zacur, Giovanni Luigi De Maria, Robin P. Choudhury, and Vicente Grau, "Point-Cloud Method for Automated 3D Coronary Tree Reconstruction from Multiple Non-Simultaneous Angiographic Projections" IEEE Transactions on Medical Imaging, 2019.
D. B. Mark et al."Accf/acr/aha/nasci/saip/scai/scct 2010 expert consensus document on coronary computed tomographic angiography: A report of the american college of cardiology foundation task force on expert consensus documents," Journal of the American College of Cardiology, vol. 55, No. 23, pp. 2663-2699, 2010.
M. H. Eng et al "Impact of Three Dimensional In-Room Imaging (3DCA) in the Facilitation of Percutaneous Coronary Interventions," Journal of Cardiology and Vascular Medicine, vol. 1, pp. 1-5, 2013.
S. Çimen et al "Reconstruction of Coronary Arteries from X-Ray Angiography: A Review," Medical Image Analysis, vol. 32, pp. 46-68, 2016.
S. J. Chen and D. Schäfer "Three-Dimensional Coronary Visualization, Part 1: Modeling," Cardiology Clinics, vol. 27, No. 3, pp. 433-452, 2009.
G. Schoonenberg et al "Three-Dimensional Coronary Visualization, Part 2: 3D Reconstruction," Cardiology Clinics, vol. 27, No. 3, pp. 453-465, 2009.
K. Wiesent et al "Enhanced 3-D-Reconstruction Algorithm for C-arm Systems Suitable for Interventional Procedures," IEEE Transactions on Medical Imaging, vol. 19, No. 5, pp. 391-403, 2000.
R. Fahrig et al "Use of a C-arm System to Generate True Three-Dimensional Computed Rotational Angiograms: Preliminary in Vitro and in Vivo Results," American Journal of Neuroradiology, vol. 18, No. 8, pp. 1507-1514, 1997.
C. Cañero et al "Predictive (Un)distortion Model and 3-D Reconstruction by Biplane Snakes," IEEE Transactions on Medical Imaging, vol. 21, No. 9, pp. 1188-1201, 2002.
W. Cong et al "Quantitative Analysis of Deformable Model-Based 3-D Reconstruction of Coronary Artery from Multiple Angiograms," IEEE Transactions on Biomedical Engineering, vol. 62, No. 8, pp. 2079-2090, 2015.
C. Blondel et al "Automatic Trinocular 3D Reconstruction of Coronary Artery Centerlines from Rotational X-Ray Angiography," in Proceedings of the 16th International Congress and Exhibition on Computer Assisted Radiology and Surgery (CARS), 2002, pp. 832-837.
A. M. Vukicevic "Three-Dimensional Reconstruction and NURBS-Based Structured Meshing of Coronary Arteries from the Conventional X-Ray Angiography Projection Images," Scientific Reports, vol. 8, No. 1711, 2018.
A. Holland et al "Diaphragmatic and Cardiac Motion During Suspended Breathing: Preliminary Experience and Implications for Breath-hold MR Imaging," Radiology, vol. 209, No. 2, pp. 483-489, 1998.
G. Shechter et al "Displacement and Velocity of the Coronary Arteries: Cardiac and Respiratory Motion," IEEE Transactions on Medical Imaging, vol. 25, No. 3, pp. 369-375, 2006.
L. Husmann et al "Coronary Artery Motion and Cardiac Phases: Dependency on Heart Rate—Implications for CT Image Reconstruction," Radiology, vol. 245, No. 2, pp. 567-576, 2007.
A. Banerjee et al "Automated Motion Correction and 3D Vessel Centerlines Reconstruction from Non-Simultaneous Angiographic Projections," in Proceedings of the 9th International Workshop on Statistical Atlases and Computational Models of the Heart, 2018, pp. 1-9.
N. Guggenheim et al "Spatial Reconstruction of Coronary Arteries from Angiographic Images," Physics in Medicine & Biology, vol. 36, No. 1, pp. 99-110, 1991.
Z. Ding and M. H. Friedman "Quantification of 3-D Coronary Arterial Motion Using Clinical Biplane Cineangiograms," The International Journal of Cardiac Imaging, vol. 16, No. 5, pp. 331-346, 2000.
P. Windyga et al "2D and 3D Knowledge Combination for the Reconstruction of Coronary Arteries: First Results on Real Data," in Proceedings of the 16th Annual International Conference of the IEEE Engineering in Medicine and Biology Society (EMBS), 1994, pp. 620-621.
N. Navab et al "3D Reconstruction from Projection Matrices in a C-arm Based 3DAngiography System," in Proceedings of the First International Conference on Medical Image Computing and Computer-Assisted Intervention (MICCAI), 1998, pp. 119-129.
E. Bullitt et al "Three-Dimensional Reconstruction of Curves from Pairs of Projection Views in the Presence of Error. I. Algorithms," Medical Physics, vol. 24, No. 11, pp. 1671-1678, 1997.
E. Bullitt et al "Three-Dimensional Reconstruction of Curves from Pairs of Projection Views in the Presence of Error. II. Analysis of Error," Medical Physics, vol. 24, No. 11, pp. 1679-1687, 1997.
A. K. W. Law et al "3D Reconstruction of Coronary Artery using Biplane Angiography," in Proceedings of the 25th Annual International Conference of the IEEE Engineering in Medicine and Biology Society (EMBS), 2003, pp. 533-536.
C. Sbert and A. F. Solé "3D Curves Reconstruction Based on Deformable Models," Journal of Mathematical Imaging and Vision, vol. 18, No. 3, pp. 211-223, 2003.
S.-Y. J. Chen and J. D. Carroll "3-D Reconstruction of Coronary Arterial Tree to Optimize Angiographic Visualization," IEEE Transactions on Medical Imaging, vol. 19, No. 4, pp. 318-336, 2000.
S.-Y. J. Chen et al "Three-Dimensional Reconstruction of Coronary Arterial Tree Based on Biplane Angiograms," in Proceedings of the SPIE Medical Imaging: Image Processing, vol. 2710, 1996, pp. 103-114.
S.-Y. J. Chen and C. E. Metz "Improved Determination of Biplane Imaging Geometry from Two Projection Images and its Application to 3D Reconstruction of Coronary Arterial Trees," Medical Physics, vol. 24, No. 5, pp. 633-654, 1997.

(56) References Cited

OTHER PUBLICATIONS

A. Zifan et al "Automatic 3D Reconstruction of Coronary Artery Centerlines from Monoplane X-Ray Angiogram Images," International Journal of Medical and Health Sciences, vol. 2, No. 3, pp. 105-110, 2008.
J. Sethian Fast Marching Methods and Level Set Methods: Evolving Interfaces in Computational Geometry, Fluid Mechanics, Computer Vision and Materials Sciences. Cambridge University Press, 1999.
A. F. Frangi et al "Multiscale Vessel Enhancement Filtering," in Proceedings of the First International Conference on Medical Image Computing and Computer-Assisted Intervention (MICCAI), 1998, pp. 130-137.
J. F. Canny "Finding Edges and Lines in Images," MIT Artificial Intelligence Lab, Technical Report 720, 1983.
P. S. P. Wang and Y. Y. Zhang "A Fast and Flexible Thinning Algorithm," IEEE Transactions on Computers, vol. 38, No. 5, pp. 741-745, 1989.
J. Y. Goulermas and P. Liatsis "Hybrid Symbiotic Genetic Optimisation for Robust Edge-Based Stereo Correspondence," Pattern Recognition, vol. 34, No. 12, pp. 2477-2496, 2001.
C. Blondel et al "4D Deformation Field of Coronary Arteries from Monoplane Rotational X-Ray Angiography," in Proceedings of the 17th International Congress and Exhibition on Computer Assisted Radiology and Surgery (CARS), 2003, pp. 1073-1078.
C. Blondel et al "3D Tomographic Reconstruction of Coronary Arteries Using a Precomputed 4D Motion Field," Physics in Medicine & Biology, vol. 49, No. 11, pp. 2197-2208, 2004.
R. Liao et al "3-D Reconstruction of the Coronary Artery Tree from Multiple Views of a Rotational X-Ray Angiography," The International Journal of Cardiovascular Imaging, vol. 26, No. 7, pp. 733-749, 2010.
Y. Boykov et al "Fast Approximate Energy Minimization via Graph Cuts," IEEE Transactions on Pattern Analysis and Machine Intelligence, vol. 23, No. 11, pp. 1222-1239, 2001.
F. Mourgues et al "3D+t Modeling of Coronary Artery Tree from Standard Non Simultaneous Angiograms," in Proceedings of the 4th International Conference on Medical Image Computing and Computer-Assisted Intervention (MICCAI), 2001, pp. 1320-1322.
G. Shechter et al "Three-Dimensional Motion Tracking of Coronary Arteries in Biplane Cineangiograms," IEEE Transactions on Medical Imaging, vol. 22, No. 4, pp. 493-503, 2003.
G. Shechter et al "Prospective Motion Correction of X-Ray Images for Coronary Interventions," IEEE Transactions on Medical Imaging, vol. 24, No. 4, pp. 441-450, 2005.
P. Fallavollita and F. Cheriet "Optimal 3D Reconstruction of Coronary Arteries for 3D Clinical Assessment," Computerized Medical Imaging and Graphics, vol. 32, pp. 476-487, 2008.
P. H. S. Torr and D. W. Murray "The Development and Comparison of Robust Methods for Estimating the Fundamental Matrix," International Journal of Computer Vision, vol. 24, No. 3, pp. 271-300, 1997.
G. Li and S. W. Zucker "Contextual Inference in Contour-Based Stereo Correspondence," International Journal of Computer Vision, vol. 69, No. 1, pp. 59-75, 2006.
M. Li, H. Yang, and H. Kudo "An Accurate Iterative Reconstruction Algorithm for Sparse Objects: Application to 3D Blood Vessel Reconstruction from a Limited No. of Projections," Physics in Medicine & Biology, vol. 47, No. 15, pp. 2599-2609, 2002.
J. Yang et al "Novel Approach for 3-D Reconstruction of Coronary Arteries from Two Uncalibrated Angiographic Images," IEEE Transactions on Image Processing, vol. 18, No. 7, pp. 1563-1572, 2009.
R. Cardenes et al "3D Reconstruction of Coronary Arteries from Rotational X-Ray Angiography," in Proceedings of the 9th IEEE International Symposium on Biomedical Imaging (ISBI), 2012, pp. 618-621.
M. Li, H. Yang, and H. Kudo "An Accurate Iterative Reconstruction Algorithm for Sparse Objects: Application to 3D Blood Vessel Reconstruction from a Limited Number of Projections," Physics in Medicine & Biology, vol. 47, No. 15, pp. 2599-2609, 2002.
S. Zheng, T. Meiying, and S. Jian "Sequential Reconstruction of Vessel Skeletons from X-Ray Coronary Angiographic Sequences," Computerized Medical Imaging and Graphics, vol. 34, No. 5, pp. 333-345, 2010.
T. F. Chan and L. A. Vese "Active Contours Without Edges," IEEE Transactions on Image Processing, vol. 10, No. 2, pp. 266-277, 2001.
R. V. Uitert and I. Bitter "Subvoxel Precise Skeletons of Volumetric Data Based on Fast Marching Methods," Medical Physics, vol. 34, No. 2, pp. 627-638, 2007.
B. K. P. Horn "Closed-Form Solution of Absolute Orientation Using Unit Quaternions," Journal of the Optical Society of America A, vol. 4, No. 4, pp. 629-642, 1987.
F. L. Bookstein "Principal Warps: Thin Plate Splines and the Decomposition of Deformations," IEEE Transactions on Pattern Analysis and Machine Intelligence, vol. 11, No. 6, pp. 567-585, 1989.
B. F. Waller et al "Anatomy, Histology, and Pathology of Coronary Arteries: A Review Relevant to New Interventional and Imaging Techniques—Part I," Clinical Cardiology, vol. 15, pp. 451-457, 1992.
D. Mumford and J. Shah "Optimal Approximation by Piecewise Smooth Functions and Associated Variational Problems," Communications in Pure and Applied Mathematics, vol. 42, pp. 577-685, 1989.
A. S. Glassner Graphics Gems, Orlando, FL, USA: Academic Press, Inc., 1990.
A. Andriotis et al "A New Method of Three-Dimensional Coronary Artery Reconstruction from X-ray Angiography: Validation Against a Virtual Phantom and Multislice Computed Tomography," Catheterization and Cardiovascular Interventions, vol. 71, pp. 28-43, 2008.
A. Iskurt et al "A Fast and Automatic Calibration of the Projectory Images for 3D Reconstruction of the Branchy Structures," Proceedings of the 47th Annual Conference on Information Sciences and Systems (CISS), pp. 1-6, 2013.
C. E. Metz and L. E. Fencil "Determination of Three-Dimensional Structure in Biplane Radiography without Prior Knowledge of the Relationship Between the Two Views: Theory," Medical Physics, vol. 16, No. 1, pp. 45-51, 1989.
M. F. Gross and M. H. Friedman "Dynamics of Coronary Artery Curvature Obtained from Biplane Cineangiograms," Journal of Biomechanics, vol. 31, No. 5, pp. 479-484, 1998.
K. R. Hoffmann et al "Biplane X-ray Angiograms, Intravascular Ultrasound, and 3D Visualization of Coronary Vessels," The International Journal of Cardiac Imaging, vol. 15, No. 6, pp. 495-512, 1999.
R. Shekhar et al "Fusion of Intravascular Ultrasound and Biplane Angiography for Three-Dimensional Reconstruction of Coronary Arteries," Proceeding of the Computers in Cardiology, pp. 5-8, 1996.
P.-A. Dorsaz et al "A New Densitometric Approach to the Assessment of Mean Coronary Flow," Investigative Radiology, vol. 32, No. 4, pp. 198-204, 1997.
N. Guggenheim et al "3D-Reconstruction of Coronary Arteries in view of Flow Measurement," The International Journal of Cardiac Imaging, vol. 8, No. 4, pp. 265-272, 1992.
M Pop, M Sermesant, S Li, J Zhao, K Rhode, A Young, K McLeod, T Mansi. Proceedings of the Statistical Atlases and Computational Modeling of the Heart (STACOM 2018) workshop.

\* cited by examiner

RECONSTRUCTION METHOD OF ORGAN VESSEL CENTERLINE

CROSS-REFERENCE TO RELATED APPLICATIONS

This application is the National Stage of International Application No. PCT/GB2019/053380, filed Nov. 29, 2019, which claims priority to GB 1819596.6, filed Nov. 30, 2018, which are entirely incorporated herein by reference.

The present invention relates to a method of producing a 3D centerline of an organ vessel from a plurality of 2D x-ray images. The method comprises the steps of producing a point-cloud of 3D points which represent intersecting and non-intersecting points between projection lines from the 2D images to their respective x-ray sources; fitting a compound curve to the points in the point-cloud of 3D points; removing outliers from the point-cloud; fitting a new compound curve to the remaining points in the point-cloud of 3D points; and repeating certain steps, wherein the resultant compound curve represents the 3D centerline of the organ vessel. The method minimizes reconstruction errors and produces an optimally-reconstructed 3D vessel skeleton.

Invasive coronary X-ray arteriography (ICA) is one of the most popular cardiac imaging modalities for detection of coronary arterial diseases, specifically coronary stenosis. Its advantages of simplicity, high spatial and temporal resolution of lumen structure, and runtime applicability during coronary interventions have made it popular among clinicians, specifically interventional cardiologists [1]. However, despite these clinical advantages, angiograms often suffer from several limitations, including issues of interpretability and existence of several artefacts. Furthermore, X-ray angiograms are 2D representations of 3D organs.

The 2D projections of 3D vascular structures in different planes suffer from vessel overlap and foreshortening, and hence create difficulties for the cardiologists to visualize and interpret the geometry of the object; this leads to high inter- and intra-observer variability and, in turn, affects the accuracy of the estimation of lesion severity and stent size [2]. The procedure gets further complicated due to the existence of several motion artefacts, mainly cardiac and respiratory motions. In addition, the adverse effects of high amounts of contrast agent and exposure to X-rays limits the number of available image projections. To overcome these inherent limitations of ICA, 3D reconstruction of coronary arterial (CA) trees from a limited number of 2D projections has become popular [3].

Several 3D CA tree reconstruction methods have been reported in the literature that deal with the problems such as suboptimal projection angles, vessel overlap, foreshortening, tortuosity and eccentricity of the ICA, etc. [3], [4], [5]. These methods either try to generate a binary representation or model of the 3D structure of the coronary arteries [4], or reconstruct the 3D volume of attenuation coefficients using image tomography [5]. In order to obtain the parameters describing acquisition geometry, some of the reconstruction methods rely on a prior calibration step for estimating the geometry parameters [6], [7]. However, some methods prefer non-calibrated data for possible table movements during image acquisition and noise in calibrated parameters and hence, they estimate geometry parameters before computing the reconstruction or jointly estimate the geometry parameters and the reconstruction [8], [9]. One major issue for any 3D CA reconstruction method from non-simultaneous angiographic projections is the existence of several motion artefacts in the images, mainly patient or imaging device related movements, respiratory motions, and cardiac motions. Although the patient or imaging device related movements can be minimized by careful image acquisition, that is, by ensuring no patient movement [10], [8], [11], it is impossible to avoid the two other sources of motion. Even if short acquisitions can be completed during a breath hold, this approach introduces potential mis-registration artefacts and hence does not necessarily ensure the generation of images at the same respiratory cycle [12]. Additionally, the patients are often not in a state to follow the breath-hold protocol. Also, the assumption of no patient movement is often violated due to invasive nature of the procedure.

To overcome the motions due to cardiac movements, the strategy of retrospective gating is commonly utilized. The underlying principle here is to select the image frames that are at the same cardiac phase in order to eliminate the cardiac motion. The most common way to achieve gating is to use an ECG signal which is simultaneously acquired with the image generation. In most of the existing reconstruction methods, the frames were selected from the end of diastole cycle, where the heart pauses for a brief period of time and hence, the cardiac motion is assumed not to exist between projections [13], [14]. However, in a single-plane rotational X-ray system, this assumption does not hold for non-simultaneous acquisitions. Single-plane systems are preferred for cardiac interventions over biplane ones due to their lower cost and the possibility of acquiring any number of image projections. Hence, geometric distortions are retained in the image projections that create ambiguities in identifying point correspondences, which are needed for 3D reconstruction.

The geometry of the 3D CA tree depends on the 3D skeleton, that is, the 3D centerlines, which are reconstructed in the 3D space using the points of intersection between lines joining the X-ray sources and the corresponding points between 2D centerlines in the projected planes. These corresponding points between 2D centerlines can be identified by finding the nearest lines joining the X-ray source to a point on the 2D centerline in other projection planes (e.g. using epipolar coordinates and the method of least squares matching). However, one of the most intuitive approaches for 3D centerline reconstruction uses the intersection between mesh surfaces (FIG. 1(a)). In cases where the centerlines follow mostly a straight line without much looping, the meshes would produce an intersection perfectly in the 3D plane, which, in turn, would generate the 3D centerline. However, coronary vessels often create C-shaped branches along their length and these generate multiple intersections between meshes.

One of the earliest 3D coronary artery (CA) reconstruction method introduced an epipolar line based technique [16]. For each point along a vessel in the first image plane, an epipolar straight line was generated in the second plane and the matching point in the second image was identified as the intersection of the epipolar line with the vessel axis. The final reconstruction was performed using a calibration matrix, estimated using least square fitting over a minimum of 6 non-coplanar points. The reconstruction method was applied on pairs of angiogram images, captured simultaneously in 30° right anterior oblique (RAO) and 60° left anterior oblique (LAO) projection planes. Although this method is susceptible to the distortions due to cardiac and breathing movements, it is widely applied in several 3D CA reconstructions [59-64]. Since that time, a number of other 3D reconstruction techniques have been introduced [17]-[48].

Among all the artefacts that degrade the reconstruction of a 3D CA tree, the possibility of generating falsely reconstructed vessels has never been addressed or explored in the existing literature. The inventors have recognised for the first time that existing modelling methods can produce more than one mathematical solution to the 3D location of a centerline: both a true and a false representation of the true coronary vessel. FIG. 1 depicts an example of the existence of falsely-generated vessel in the 3D reconstruction of a right coronary artery (RCA), since the RCA produces a C-shaped branch in all its angiographic projections, mainly left anterior oblique (LAO)-straight and anterior-posterior (AP) cranial. Example 1 describes how mathematically accurate but anatomically infeasible solutions to such problems may be obtained.

In this regard, one objective of the proposed invention is to generate 3D arterial tree from multiple angiographic projections without the need for any assumption during image acquisition.

A novel point-cloud approach is proposed for the reconstruction of 3D centerlines that minimizes reconstruction errors, that is, the 2D back-projection errors at all projection planes and produces optimally reconstructed 3D vessel skeletons.

The performance of the proposed 3D CA reconstruction technique has been qualitatively and quantitatively evaluated for the reconstruction of both right coronary arteries (RCA) and left coronary arteries (LCA) of patients admitted to hospital for suspected coronary stenosis. The proposed method has generated an average back-projection error of 0.286 mm for RCA centerlines reconstruction and an average error of 0.3049 mm for the reconstruction of LCA centerlines. The performance has been further evaluated by back-projecting the generated 3D vascular models on independent projection planes, which were not involved in the 3D reconstruction procedure, and it has produced an average back-projection error of 0.8263 mm.

The method of the invention improved the performance of the 3D centerline reconstruction compared to that of a recently-developed 3D CA reconstruction algorithm by Galassi et al. [48] and the improvement was statistically significant.

Although the proposed method does not depend on identifying point correspondences between projections for 3D reconstruction, it actually produces point correspondences from the generated 3D centerlines. From this perspective, the previous 3D reconstruction algorithms may be regarded as sequential pipelines where the identification of point correspondences facilitate 3D reconstruction. In contrast, the method of the invention develops a pipeline where the point correspondences are first identified from initially reconstructed centerlines; they then facilitate the reconstruction of optimised 3D centerlines in an iterative fashion. Hence, by iteratively optimizing these two steps, the proposed approach generates an optimally-reconstructed 3D centerline. In addition, the partition of reconstructed centerlines into accurate and incorrectly reconstructed segments creates a natural ordering in the 2D centerlines on projected planes, which, in turn, solves the problem of falsely-reconstructed vessel segments generated from mesh intersections. The problem of foreshortening is automatically solved by incorporating many-to-one correspondences of 2D centerlines into the point-cloud set. The method of the invention does not require the selection of any corresponding landmark points or branchmark points, and it can automatically identify the corresponding proximal and distal locations along vessels. Additionally, the proposed approach automatically rectifies any incorrect warping of the 2D centerlines that are generated during the proposed non-rigid motion correction.

In one embodiment, the invention provides a method of producing a 3D centerline of an organ vessel from a plurality of 2D images, the plurality of 2D images having been produced from one or more x-ray sources, all images being of the same organ in different projection planes, the images having been pre-processed to identify 2D vessel centerlines, the method comprising the steps:

(A) producing a point-cloud of 3D points which comprises:
    (i) a first set of points which represent the intersection points between
        (a) projection lines from a plurality of points on a 2D vessel centerline from a first 2D image to the first x-ray source, and
        (b) projection lines from a plurality of points on a 2D vessel centerline from a second 2D image to the second x-ray source; and
    (ii) a second set of points which represent the nearest orthogonal points between projection lines (a) and (b) if projection lines (a) and (b) do not intersect;

(B) fitting a compound curve to the points in the point-cloud of 3D points, the curve having a defined number of breakpoints;

(C) removing outliers from the point-cloud;

(D) fitting a new compound curve to the remaining points in the point-cloud of 3D points, the new compound curve having an increased number of breakpoints compared to the previous compound curve; and (E) repeating Steps (C) and (D) one or more times;

wherein the resultant compound curve represents the 3D centerline of the organ vessel.

The method of the invention is preferably computer-implemented.

As used herein, the term "centerline" refers to a 2D or 3D line or curve which is at or approximates to the axis of the organ vessel over a set distance (e.g. over the distance of a segment).

As used herein, the term "segment" refers to a piece of the vessel, i.e. a stretch between any two points on the vessel. Segment lengths may, for example, be from 1 mm to 20 cm. Other examples include 1-25 mm, 25-50 mm, 1-2 cm, 1-5 cm, 5-10 cm and 10-20 cm.

The length of left main coronary artery ranges from 1 to 25 mm before bifurcating into the left anterior descending (LAD) and left circumflex (LCx) arteries. The LAD artery varies between 10-13 cm in length, while the LCx artery usually measures 6-8 cm in length. The length of right coronary artery is usually around 12-14 cm before giving rise to the posterior descending artery [53].

In one embodiment, the invention provides a method of producing a 3D centerline of an organ vessel from a plurality of 2D images.

The organ may be any organ which comprises fluid-filled vessels. For example, the organ may be a heart, brain, liver, pancreas, spleen, lung, or kidney. Preferably, the organ is a heart.

The organ is preferably a mammalian organ, e.g. a mouse, rat, cow, pig, horse, monkey, or human organ. All or part of the organ may be imaged. Preferably, the organ is a human organ.

The vessel may be any vessel which is permanently or transiently filled with a fluid (preferably a liquid). Examples of vessels include arteries, veins, capillaries, and sinuses. Examples of fluids include blood, lymph, urine and semen.

Preferred examples of arteries include arteries of the heart, e.g. the coronary arteries (left and right), marginal arteries (left and right), descending arteries (posterior and left anterior), left circumflex artery, and diagonal branches. The vessel may also be a coronary sinus.

Preferred examples of brain vessels include the cerebral artery (anterior, middle, and posterior), vertebral artery, cerebellar artery (posterior inferior, anterior inferior, and superior), etc. The organ may also be part of the lymphatic system.

The invention relates primarily to X-ray angiogram images; these may be generated from single-plane rotational X-ray systems (C-arm). In order to reduce the effects of foreshortening and vessel overlapping, the acquisition angle (either primary or secondary) of an image should preferably differ from that of the other images by at least 30°. The method of the invention will also work on images acquired by biplane rotational X-ray systems.

The method of the invention produces a 3D centerline of an organ vessel from a plurality of 2D images. The 2D images are ones that have been produced from a single-plane rotational X-ray C-arm system. All of the images are of the same organ in different planes. The organ will have been placed between the X-ray source and the image-capturing device.

The X-ray images may be obtained by using an X-ray apparatus with a rotatable source around its isocenter. To enable such rotations, conventional X-ray apparatus are equipped with a C-arm, the technical details of such a construction falling within the scope of general knowledge of a person skilled in the art of X-ray imaging.

The 2D images may be been produced using the same or different x-ray sources, preferably using the same x-ray source (at different positions).

Preferably, the one or more vessels in the x-ray image have been injected with a contrast agent to help to distinguish the path of the vessel over the background.

All images are X-ray angiogram images. Preferably the acquisition angle (either primary or secondary) of an image captured from either single or bi-plane system should differ from that of the other images by at least 30°, in order to reduce the effects of foreshortening and vessel overlapping.

The 2D images may have been obtained using a single-plane or bi-plane system, inter alia. The x-ray apparatus may be a calibrated or non-calibrated system.

The method of the invention may be operated using 2 or more images, e.g. 2, 3, 4, 5, 6, 7, or 8. One key advantage of the method of the invention is that it can be operated using only 2 images. Preferably, therefore, the plurality of images is 2 images.

In some embodiments of the invention, the point-cloud of 3D points comprises:
(i) a first set of points which represent the intersection points between
  (a) projection lines from a plurality of points on a 2D vessel centerline from a first 2D image to the first x-ray source,
  (b) projection lines from a plurality of points on a 2D vessel centerline from a second 2D image to the second x-ray source,
  (c) projection lines from a plurality of points on a 2D vessel centerline from a third 2D image to the third x-ray source, and optionally
  (d) projection lines from a plurality of points on a 2D vessel centerline from a fourth 2D image to the fourth x-ray source; and
(ii) a second set of points which represent the nearest orthogonal points between projection lines (a), (b), (c), and optionally (d), if the projection lines do not intersect.

In embodiments of the invention wherein the organ to be imaged is a heart, the primary angle of the acquired image is preferably left anterior oblique (LAO), right anterior oblique (RAO), or anterior posterior (AP). The secondary angle of the acquired image is preferably cranial, straight, or caudal.

In order to help to reduce cardiac motion, one or more of the images may be ECG-gated. In such cases, the image is preferably obtained at the end of diastole.

The 2D images are preferably first pre-processed in order to extract the relevant image features. The input images are preferably first processed using a suitable filter which identifies tubular structures and/or removes background anatomy, such as bones and muscle tissues, in order to produce a vesselness image. Most preferably, a suitable filter is used which identifies tubular structures and simultaneously removes background anatomy, such as a classic Hessian-based multiscale filter, e.g. a Frangi filter as described in [29]. The resulting vesselness image, i.e. the maximum response for each pixel, provides a measure for the probability of each pixel belonging to a vessel.

The filter may be calculated for different scales in order to enhance vessels with different diameters.

Preferably, a plurality (e.g. 5-9, preferably 6-8 or 7) linearly-increasing scales are used. These may range from 0.5 mm to 4 mm (which approximately correspond to the radius range of projected coronary arteries).

Assuming the intensity values of an image as a discrete function, the Hessian matrix containing the second-order partial derivatives is first calculated at each pixel. Preferably, the Hessian matrix is approximated to a continuous function based on Gaussian filter and the differentiation property of convolution. Next, the eigenvalues are calculated from the Hessian matrix in order to extract information about contrast and direction. For vessel pixels, the eigen vector corresponding to the eigenvalue of smallest magnitude points towards the direction of the vessel. In general, the smallest eigenvalue for vessel pixel is very close to zero. The eigen vector corresponding to the second smallest eigenvalue points towards the edge of the vessel. Based on that, anisotropy measure is defined as the ratio of the magnitude of two smallest eigen values, while contrast is defined as the square-root of the sum of squares of two smallest eigenvalues. Since anisotropy is very low for vessel pixels, smaller value of anisotropy indicates the pixel is a vessel. Similarly, since contrast will be low if both the eigenvalues are small for the lack of contrast, larger contrast indicates the possibility of the pixel being a vessel. Hence, if there is a high probability that the pixel being analysed is part of a vessel, a high output value is measured by "vesselness equation", which is a function of the anisotropy and contrast of the pixel. The process is repeated for every pixel and the response values are returned as the vesselness image.

The vessels which have been identified in the vesselness image may then be segmented, preferably using an automated vessel segmentation process. Examples of automated vessel segmentation processes include active contour region growing algorithms (e.g. the Chan-Vese model [49]).

The Chan-Vese model is based on the Mumford-Shah functional [54] for segmentation. The model is based on an energy minimization problem, which can be reformulated in the level set formulation. In level set formulation, the problem becomes a "mean-curvature flow"-like evolving the active contour that will stop at the desired boundary. From the initial mask, the signed distance function (sdf) for each pixel is computed, which determines the distance of the pixel from the boundary of the region, with the sign determined by whether the pixel lies inside the region. Next, the interior and exterior means are computed based on sdf and they are applied to calculate the force from image information. The force from curvature penalty is calculated and the energy function is minimized based on gradient descent criteria. The curve is then evolved and the procedure is iterated from computation of the means. This approach is suitable for segmenting objects with very smooth boundaries or even with discontinuous boundaries.

2D vessel centerlines may then be extracted from the segmented vessels, preferably along with the corresponding vessel boundaries.

Examples of algorithms which may be used in this regard include a fast-marching level set algorithm, e.g. [50].

The fast marching level set method interprets vessel boundaries as the propagating front final position. The front expands outward from a seed point towards an end point selected by the user (by simple mouse-clicking) and with a speed inversely proportional to the gradient magnitude of the vesselness image (i.e. within a vessel, the gradient is low and the front propagates fast, while at the boundaries the gradient is high and the front slows down). A constrained map may be defined such that the front propagation is constrained to values within the range 0.1±1 (a low boundary >0 may be required to avoid losing regions that show low vessel-like structures due to insufficient contrast). The exact position of the selected initialization points should not influence the behaviour of the fast marching process, as long as they are located within a vessel. Selection of one start and one end point worked robustly for a targeted arterial segment. The user can select multiple initialization points, for detection of multiple vessels. The subsequent analysis proceeds automatically, i.e. with no additional manual interaction.

To compute the vessel centerline, a subvoxel precise skeletonization method may be applied [50]. The centerline may be computed as the minimum-cost path from an end point to a start point by performing a gradient descent on the fast marching distance map (cost function). Given the skeleton of a coronary tree in the form of a binary image, the nodes (i.e. branching points) and segments, which are bifurcation-free subsets of the skeleton, may be detected and labelled on each projection by exploiting the connectivity matrix of the binary image. To this end, connected pixels may be found using an eight-connectivity seed-fill algorithm [55]. The seed-fill algorithm starts from a seed point (a foreground pixel) and then iteratively searches its neighbours to detect connected components. For different projections, labels can propagate differently. To ensure correspondence of labels, the initialization points previously selected for vessels extraction (i.e. fast marching seed points) may be employed. These points are indicated so that they correspond across projections. An initialization point may be matched to a node based on the Euclidean distance. Only nodes having a matching initialization point are retained. Therefore, node labels across projections are ensured to correspond, and so are branches.

The 2D centerlines may be represented as cubic B-splines. A cubic B-spline representation allows a combination of smoothing with the ability to evaluate derivatives, and hence vessel orientations, at any location, thus enabling the steps that follow.

One of the main problems with 3D reconstruction of vessel trees is that the acquired images from different views do not correspond to the same geometry due to rigid and/or non-rigid movements.

Rigid movements may be caused by patient or device-related movements during or between image acquisitions; these may cause translation or rotation of features. For example, respiratory movements of the lungs cause rigid movement in the heart and, hence, in the heart vessels.

Non-rigid movements (e.g. vessel stretching or compressing), mostly due to cardiac motions, may also occur in vessels, particularly around the mid-regions of vessels.

Preferably, the effects of rigid motion are removed prior to the reconstruction of the 3D tree. Any suitable algorithm may be used in this regard. Examples of suitable algorithms include those known in the art (e.g. [24], [56]-[58]).

In a preferred embodiment, the effects of rigid movement are removed by estimating the optimal rigid transformations of all projection planes that minimize the rigid movement of the organ (e.g. heart) during imaging. This motion may be modelled by estimating the transformed locations of the projection planes that optimize the match between projections.

Most preferably, the effects of rigid motion are removed by:
(i) selecting (e.g. manually) a plurality (preferably 4-6) of vessel landmarks (e.g. bifurcation points of vessels) from all projection planes;
(ii) estimating the 3D landmark locations as the point of intersection of 3D projection lines connecting the vessel landmarks on projection planes with the X-ray source;
(iii) estimating the optimal rigid transformation (translation and/or rotation) from each plane such that the back-projected 3D landmarks on the transformed projection planes match with the corresponding landmarks on 2D image planes;
(iv) repeating steps (ii) and (iii) until convergence or the maximum number of iterations have been reached; and
(v) returning the optimal rigid transformation that minimises the effect of rigid motion.

Preferably, the rigid motion is corrected using the following method:

Let us assume the motion-corrected 3D locations of r landmark points are given by $B_i$, i=1, . . . , r and the true location of landmark $B_i$ on the jth projection plane is $b_{ij}$, j=1, . . . , s. Also, assume the location of X-ray source, origin, and normal of projection plane are defined as $F_j$, $M_j$, and $N_j$, j=1, . . . , s, respectively. Hence, the objective is to estimate the optimal rigid transformation (translation $t_j$ and rotation $R_j$, j=1, . . . , s) from each plane, so that the projections of $B_i$, i=1, . . . , r on each of the transformed angiographic planes match with the corresponding landmarks in 2D image planes, that is, $$\min_{t_j, R_j} \sum_{i=1}^{r} \|B_{i,j'} - (t_j + R_j * b_{ij})\|^2 \forall j = 1, \cdots, s. \quad (1)$$

Here, j' denotes the jth plane transformed by $(t_j, R_j)$ and $B_{i,j'} = B_i - (N_{j'} \cdot (B_i - M_{j'})) * N_{j'}$ denotes the projection of $B_i$ on plane j'. The optimization in (1) is solved using Horn's quaternion-based method [51]. Now, since the motion-corrected 3D locations $B_i$ are not known, these 3D landmark locations are estimated as the point of intersection of 3D projection lines $\overrightarrow{F_j b_{ij}}$, j=1, . . . , s, or their nearest orthogonal point, in case of non-intersecting projection lines, i.e., $$B_i = \operatorname*{argmin}_p \sum_j D(p; F_j, b_{ij}), \quad (2)$$

where $D(p; F_j, b_{ij}) = \|(b_{ij}-p) - ((b_{ij}-p)^T(b_{ij}-F_j))(b_{ij}-F_j)\|^2$ denotes the distance of the point p to $\overrightarrow{F_j b_{ij}}$. The minimization is solved iteratively, where, in each iteration, the 3D landmark points are generated using (2) and then projected on angiographic planes to estimate the optimal rigid transformation using (1). The procedure is iterated until there is no change in projected landmark points on angiographic planes, or the maximum number of iterations has been reached. The algorithm usually requires 8-20 iterations to converge.

Although the proposed rigid motion correction can remove most of the motion artefacts from images, some amount of non-rigid motion may still remain mostly around the region with small radius of curvature (in terms of vessel stretching or compressing mostly due to cardiac motions).

Preferably, therefore, the effects of non-rigid motion are removed prior to the reconstruction of the 3D image. Any suitable algorithm may be used in this regard. Examples of suitable algorithms include non-rigid motion correction based on image warping (e.g. radial basis function based warping, proposed by Bookstein [52]).

In a preferred embodiment, the effects of non-rigid movement are removed by the steps:

(i) estimating the warping function from each projection plane, which transforms the selected (e.g. manually) 2D vessel landmarks to the rigid motion corrected 2D landmark locations (i.e. back-projected 3D landmarks on the transformed projection planes);

(ii) applying the warping function for each projection plane to the 2D centerline in those projection planes;

(iii) returning the warped 2D centerlines as the non-rigid motion corrected centerlines.

Preferably, the non-rigid motion is corrected using the following method:

Let $p_i=(x_i,y_i)$ be the true 2D coordinate of $b_{ij}$ in the jth projection plane and $p'_i=(x'_i,y'_i)$ be the rigid-motion corrected projection of $B_i$ in the same plane. To model the difference between $p_i$ and $p'_i$ due to non-rigid motion in vessels, we define, $K=((k_{mn}))$ where $$k_{mn} = \exp\left(-\frac{\|z_m - z_n\|^2}{r^2}\right),$$

r being the normalising constant; $z_m = \|p'_m - p_m\|$, $P=[\underline{1},\underline{p}]$, and $$L = \begin{bmatrix} K & P \\ P^T & 0 \end{bmatrix}.$$

$W=L^{-1}*p'$ is called the coefficient matrix. Hence, the warped 2D centerline, modelling non-rigid motion at jth projection plane, is given by $$c'_j = L^{\bigstar} * W, \quad (3)$$

where $c_j$ is the rigid-motion corrected 2D centerline, $L^{\bigstar} = [K', \underline{1}, c_j]$, $K' = ((k'_{mn}))$, $$k'_{mn} = \exp\left(-\frac{\|z'_m - z'_n\|^2}{r^2}\right),$$

and $z'_m = \|c_j - p'_m\|$.

Although many motion-correction algorithms are able to significantly reduce the effects of rigid as well as non-rigid motions from the vessel projections, distortions often still remain in the 2D vessel centerlines; these create ambiguities in identifying point-to-point correspondences as well as in intersections between mesh surfaces.

The method of the invention first aims to identify all possible point correspondences from the intersections between projected surfaces and produces points in 3D space to generate an initial dense point-cloud. This step considers all possible point correspondences that have any possibility of generating the 3D centerline of the vessel tree. The 3D point-cloud generated in this way serves as the upper-boundary of the set containing 3D centerline points.

Step (A) of the method of the invention comprises:

(A) producing a point-cloud of 3D points which comprises:

(i) a first set of points which represent the intersection points between
  (a) projection lines from a plurality of points on a 2D vessel centerline from a first 2D image to the first x-ray source, and
  (b) projection lines from a plurality of points on a 2D vessel centerline from a second 2D image to the second x-ray source; and (ii) a second set of points which represent the nearest orthogonal points between projection lines (a) and (b) if projection lines (a) and (b) do not intersect.

The point-cloud of 3D points is a data set comprising two sets of points. The first set of points relates to intersecting projection lines; the second set of points relates to non-intersecting projection lines.

The "plurality of points on a 2D vessel centerline from a first 2D image" may be selected by any suitable method. Preferably, the plurality of points is generated by the initial 2D centerline extraction method, for example using a fast-marching method. The same applies, mutatis mutandis, to the selection of the "plurality of points on a 2D vessel centerline from a second 2D image", and in any further images. The plurality of points used in (a) and (b) on the 2D vessel centerlines is preferably not the same plurality of (corresponding) points for the two (or more) images.

Since the point correspondences are not established at the initial stage of the algorithm, all possible intersecting points and non-intersecting orthogonal points are considered at this stage. The first set consists of points only from the intersecting projection lines, while the second set consists of all nearest orthogonal points between non-intersecting projection lines generated from the plurality of points on 2D vessel centerlines of projection planes to the corresponding x-ray sources. In the second set, the generated point minimizes the distance between two projection lines in 3D space, i.e. it is situated at the middle between two nearest points on two projection lines. Hence, if there are respectively M and N number of points on 2D vessel centerlines in two image planes, the initial point-cloud will consider M*N number of points.

From the generated initial point-cloud, redundant and irrelevant representative points are preferably then removed to make a more compact and accurate point-cloud.

At the first step, those 3D points are removed where the projection lines connecting X-ray sources to the corresponding points on 2D centerlines, i.e. $\vec{F_j c_{ji}}$, j=1, ..., s, i=1, ..., $n_j$, passes through more than at set distance from each other.

In other terms, 3D point corresponding to (j,i;j',i') is removed from point-cloud if $$D(\vec{F_j c_{ji}}, \vec{F_j c_{j'i'}}) > \epsilon, j' \neq j=1, \ldots, s \quad (4)$$

In some embodiments, therefore, the second set of points does not comprise orthogonal points between non-intersecting projection lines (a) and (b) if the orthogonal distances between projection lines (a) and (b) are greater than a set amount; or such points are subsequently eliminated from the second set.

Preferably, the set amount is the average maximum diameter of the vessel which is being imaged. Examples of this set amount include 1, 2, 3, 4, and 5 mm. For example, the average maximum diameter of blood vessels is 2-5.5 mm. Other examples include the left coronary artery, 2.0-5.5 mm; left anterior descending, 2.0-5.0 mm; left circumflex, 1.5-5.5 mm; and right coronary artery, 1.5-5.5 mm. With regard to arteries of the heart, the set amount may be 2, 3, 4, or 5 mm.

To consider the issue of foreshortening of vessels, the proposed method allows many-to-one point correspondences between centerlines on projected planes. However, considering all many-to-one correspondences from each plane unnecessarily crowds the point-cloud. Hence, for each point along the centerline from every projection plane, preferably at most 8, for example, nearest point correspondences (with distance less than 2 mm, for example) are considered in the point-cloud. This assumption significantly reduces the volume of the point-cloud and provides a more compact upper boundary for the generation of the 3D centerline.

In some embodiments, therefore, the second set of points does not comprise orthogonal points between non-intersecting projection lines (a) and (b) if, when the orthogonal distances between all non-intersecting points are ranked in increasing size order, the position of the orthogonal distance in the ranking is lower than a set rank; or such points are subsequently eliminated from the second set.

Preferably, the second set of points does not comprise orthogonal points between non-intersecting projection lines (a) and (b) if, when the orthogonal distances between all non-intersecting points are ranked in increasing size order, the position of the orthogonal distance in the ranking is lower than 8th place in the rank (e.g. 9th, 10th, 11th, 12th, etc.); or such points are subsequently eliminated from the second set. The same applies to projection lines (c) and (d), mutatis mutandis, when present.

Step (B) comprises the step of fitting a compound curve to the points in the cloud of 3D points, the compound curve having a defined number of breakpoints (knots).

The compound curve is fitted using any appropriate mathematical model. Preferably, the compound curve is a B-spline (basis-spline), more preferably a cubic B-spline.

A B-spline of order n is a piecewise polynomial function of degree n−1 in a variable x. The values of x where the pieces of polynomial meet are known as breakpoints or knots, denoted by, $t_0$, $t_1$, $t_2$, ..., and are sorted into non-decreasing order. When the breakpoints (or knots) are distinct, the first n−1 derivatives of the polynomial pieces are continuous across each breakpoint (knot). When r breakpoints (knots) are coincident, then only the first n−r derivatives of the spline are continuous across that breakpoint (knot). Preferably, the initial number of breakpoints is 20-40, more preferably 20-30.

After the first compound curve has been fitted to the initial set of points in the 3D point-cloud, the points which lie far from the generated compound curve, i.e. the outlier points, are removed from the 3D point-cloud. Step (C) therefore comprises removing outlier points from the 3D point-cloud.

As used herein, the term "outlier points" refers to ones wherein the orthogonal distance between the point and the compound curve is greater than a set distance. Preferably, the set distance in this context is 2-5 (e.g. 2-3, 3-4, or 4-5) times the average of the Euclidean distances of the points on the 3D compound curve (preferably, B-spline) to the points in the point-cloud that are orthogonal to the curve at that point. More preferably, the set distance is 3 times the aforementioned average distance.

In the next step, Step (D), another compound curve is drawn through the reduced point-cloud set with a comparatively-higher number of breakpoints (than before) in order to reduce the problem of over-smoothing the 3D centerline.

The outlier points are again removed from the 3D point-cloud set and the process is again repeated while increasing the number of breakpoints in each iteration to reduce the smoothness of the curve fitting.

Step (D) therefore comprises repeating Steps (B) and (C) one or more times, each time fitting a new compound curve having an increased number of breakpoints compared to the previous curve to the remaining points in the point-cloud of 3D points.

The process of iteration increases of the number of breakpoints and the removal of outliers. This solves the problem of over-smoothing the 3D centerline, while keeping it unaffected from the effect of outliers. The method of the invention typically takes about 4 iterations to converge and produces the 3D vessel centerline. Preferably, therefore, Steps (B) and (C) are repeated 2-6 times, more preferably 3, 4 or 5 times.

The 3D centerlines generated in the above steps provide a satisfactory representation of the 3D skeleton of the vessel tree.

However, the 3D skeleton generated above may not provide an optimally-generated 3D vessel skeleton and it may still be susceptible to the inclusion of falsely-reconstructed vessel segments. To solve this issue, the above-generated 3D centerlines are first back-projected onto the original 2D projection planes and compared with the original 2D centerlines. This comparison enables the reconstructed centerlines to be partitioned into correctly and incorrectly reconstructed vessel segments and, in turn, it provides a correspondence between segments of 2D centerlines. Accurately-reconstructed centerlines provide perfect point correspondences, whilst incorrectly-reconstructed centerlines provide correspondences between segments. For these incorrectly-reconstructed segments, reduced point-cloud sets are again identified from the corresponding segments of 2D projection planes. Hence, a new point-cloud set is generated where accurate reconstruction has contributed with perfect point correspondences, whilst the incorrectly-reconstructed segment has generated a much smaller, but ordered, point-cloud. The procedure is iterated until the reprojections of generated 3D centerlines accurately match the corresponding 2D centerlines on all projected planes, that is the average reprojection error is minimized. Usually, the procedure does not take more than 3 iterations to converge.

Hence the method of the invention preferably additionally comprises the steps of:

(F) back-projecting the resultant compound curve representing the 3D centerline of the organ vessel onto the first and second 2D images;

(G) comparing segments of the back-projected compound curve to the corresponding segments of the 2D centerlines in the first and second images by determining the degree of point-to-point correspondences between a plurality of points on each of the segments of the back-projected compound curve and the corresponding points on the segments of the 2D centerlines in the first and second images;

(H) generating a further point-cloud of 3D points which comprises:

(i) for segments with high degrees of point-to-point correspondences between the plurality of points on the segments of the back-projected compound curve and the corresponding points on the segments of the 2D centerlines in the first and second images, a first set of points which represent the intersection points between (a) projection lines from the plurality of points on those segments in the first 2D image to the first x-ray source, and (b) projection lines from the corresponding points on the corresponding segments in the second 2D image to the second x-ray source;

and (ii) for segments with low degrees of point-to-point correspondences between the plurality of points on the segments of the back-projected compound curve and the corresponding points on the segments of the 2D centerlines in the first and second images, a second set of points which represent the intersection points between (a) projection lines from the plurality of points on those segments in the first 2D image to the first x-ray source, and (b) projection lines from the plurality of points on the corresponding segments in the second 2D image to the second x-ray source;

a third set of points which represent the nearest orthogonal points between projection lines (a) and (b) if projection lines (a) and (b) do not intersect;

(I) fitting a compound curve to the points in the further point-cloud of 3D points, the compound curve having a defined number of breakpoints;

(J) removing outliers from the point-cloud of 3D points;

(K) fitting a new compound curve to the remaining points in the point-cloud of 3D points, the new compound curve having an increased number of breakpoints compared to the previous compound curve; and (L) repeating Steps (J) and (K) one or more times;

wherein the resultant compound curve represents the 3D centerline of the organ vessel.

In some embodiments, Steps (F) to (L) are repeated one or more times (e.g. 1, 2, 3, 4 or 5 times).

In some embodiments, the second set of points does not comprise orthogonal points between (non-intersecting) projection lines (a) and (b) if, when the orthogonal distances between all such points are ranked in increasing size order, the position of the orthogonal distance in the ranking is lower than a set rank; or such points are subsequently eliminated from the second set.

Preferably, the second set of points does not comprise orthogonal points between such projection lines (a) and (b) if, when the orthogonal distances between all such points are ranked in increasing size order, the position of the orthogonal distance in the ranking is lower than 8th place in the rank (e.g. 9th, 10th, 11th or 12th); or such points are subsequently eliminated from the second set.

The back-projection is carried out for the whole length of the vessel; this will cover all segments.

For the generation of luminal cross-sections along the centerlines, the non-uniform rational basis splines (NURBS) method may be applied to parameterize luminal contours over the vessel (e.g. as described in [48]). For the generation of 3D lumen surface of the vessel, the NURBS surface model may be applied over generated luminal cross-sections (e.g. as described in [48]).

In a further embodiment, the invention provides a system or apparatus comprising at least one processing means arranged to carry out the steps of a method of the invention, and the use of system or apparatus comprising at least one processing means in a method of the invention. In some embodiments, the system is an X-ray imaging device.

The processing means may, for example, be one or more computing devices and at least one application executable in the one of more computing device. The at least one application may comprise logic to carry out the steps of a method of the invention.

In a further embodiment, the invention provides a carrier bearing software comprising instructions for configuring a processor to carry out the steps of a method of the invention.

Reference is made to FIG. 15, which depicts an apparatus 1010 in which the systems and methods described herein may be implemented. The apparatus 1010 may be embodied in any one of a wide variety of wired and/or wireless computing devices, multiprocessor computing device, and so forth. As shown in FIG. 15, the apparatus 1010 comprises memory 214, a processing device 202, a number of input/output interfaces 204, a network interface 206, a display 205, a peripheral interface 211, and mass storage 226, wherein each of these devices are connected across a local data bus 210. The apparatus 1010 may be coupled to one or more peripheral measurement devices (not shown) connected to the apparatus 1010 via the peripheral interface 211.

The processing device 202 may include any custom made or commercially available processor, a central processing unit (CPU) or an auxiliary processor among several processors associated with the apparatus 1010, a semiconductor based microprocessor (in the form of a microchip), a macroprocessor, one or more application specific integrated circuits (ASICs), a plurality of suitably configured digital logic gates, and other well-known electrical configurations comprising discrete elements both individually and in various combinations to coordinate the overall operation of the computing system.

The memory 214 can include any one of a combination of volatile memory elements (e.g., random-access memory (RAM, such as DRAM, and SRAM, etc.)) and nonvolatile memory elements (e.g., ROM, hard drive, tape, CDROM, DVD, etc.). The memory 214 typically comprises a native operating system 216, one or more native applications, emulation systems, or emulated applications for any of a variety of operating systems and/or emulated hardware platforms, emulated operating systems, etc. For example, the applications may include application specific software which may be configured to perform some or all of the systems and methods described herein. In accordance with such embodiments, the application specific software is stored in memory 214 and executed by the processing device 202. One of ordinary skill in the art will appreciate that the memory 214 can, and typically will, comprise other components which have been omitted for purposes of brevity.

Input/output interfaces 204 provide any number of interfaces for the input and output of data. For example, where the apparatus 1010 comprises a computer, these components may interface with one or more user input devices 204. The display 205 may comprise a computer monitor, a screen for a PC, a liquid crystal display (LCD) on a hand held device, or other display device.

In the context of this disclosure, a non-transitory computer-readable medium stores programs for use by or in connection with an instruction execution system, apparatus, or device. More specific examples of a computer-readable medium may include by way of example and without limitation: a portable computer diskette, a random access memory (RAM), a read-only memory (ROM), an erasable programmable read-only memory (EPROM, EEPROM, or Flash memory), and a portable compact disc read-only memory (CDROM) (optical).

With further reference to FIG. 15, network interface device 206 comprises various components used to transmit and/or receive data over a network environment. For example, the network interface 206 may include a device that can communicate with both inputs and outputs, for instance, a modulator/demodulator (e.g., a modem), wireless (e.g., radio frequency (RF)) transceiver, a telephonic interface, a bridge, a router, network card, etc.). The apparatus 1010 may communicate with one or more computing devices (not shown) via the network interface 206 over a network 118. The apparatus 1010 may further comprise mass storage 226. The peripheral 211 interface supports various interfaces including, but not limited to IEEE-1394 High Performance Serial Bus (Firewire), USB, a serial connection, and a parallel connection.

The apparatus 1010 shown in FIG. 15 may be embodied, for example, as an X-ray imaging apparatus, which includes a processing module or logic for performing conditional data processing, and may be implemented either off-line or directly in an X-ray imaging apparatus.

The flowcharts of FIGS. 13 and 14 show examples of functionality that may be implemented in the apparatus 1010 of FIG. 15. If embodied in software, each block shown in FIGS. 13 and 14 may represent a module, segment, or portion of code that comprises program instructions to implement the specified logical function(s). The program instructions may be embodied in the form of source code that comprises machine code that comprises numerical instructions recognizable by a suitable execution system such as the processing device 202 (FIG. 15) in a computer system or other system. The machine code may be converted from the source code, etc. If embodied in hardware, each block may represent a circuit or a number of interconnected circuits to implement the specified logical function(s).

Although the flowcharts of FIGS. 13 and 14 show a specific order of execution, it is understood that the order of execution may differ from that which is depicted. For example, the order of execution of two or more blocks may be scrambled relative to the order shown. Also, two or more blocks shown in succession in FIGS. 13 and 14 may be executed concurrently or with partial concurrence. Further, in some embodiments, one or more of the blocks shown in FIGS. 13 and 14 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that comprises software or code can be embodied in any non-transitory computer-readable medium for use by or in connection with an instruction execution system such as, for example, a processing device 202 in a computer system or other system. In this sense, each may comprise, for example, statements including instructions and declarations that can be fetched from the computer-readable medium and executed by the instruction execution system.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

The disclosure of each reference set forth herein is specifically incorporated herein by reference in its entirety.

EXAMPLES

Figure 1A:
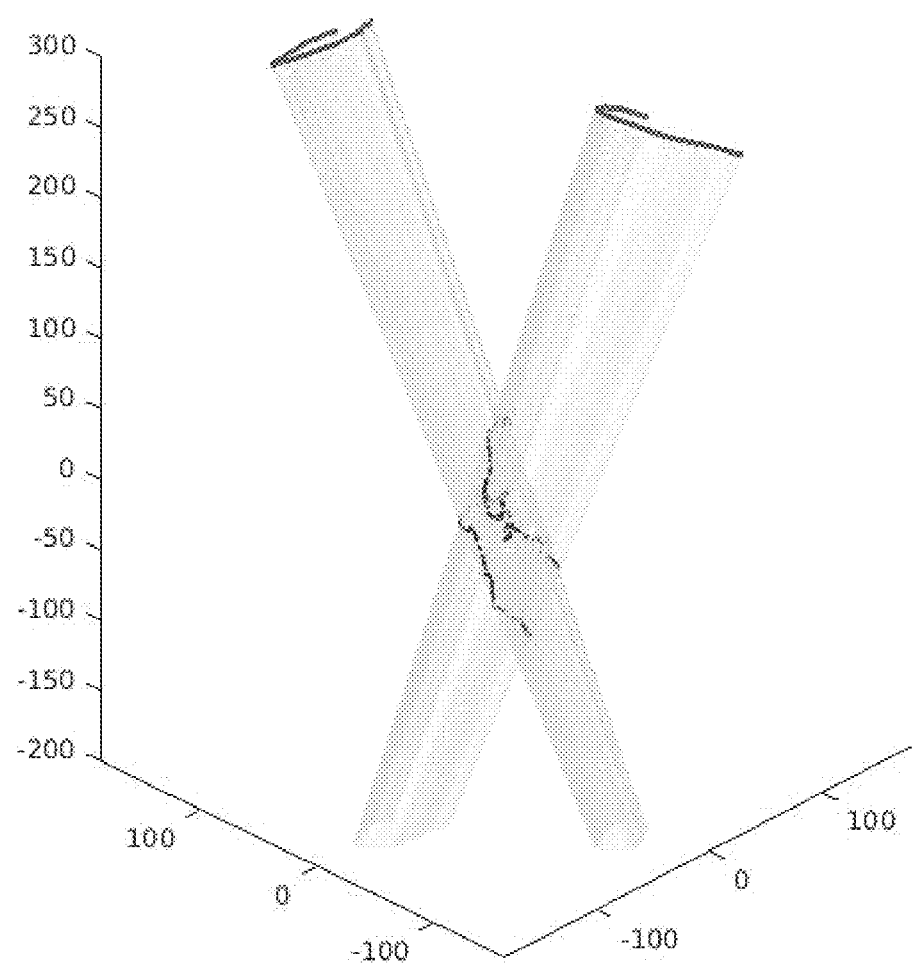
FIG. 1: Existence of false reconstruction during identification of point correspondences for RCA reconstruction. (A) Mesh reconstruction. (B) Zoomed-up part.
Figure 1B:
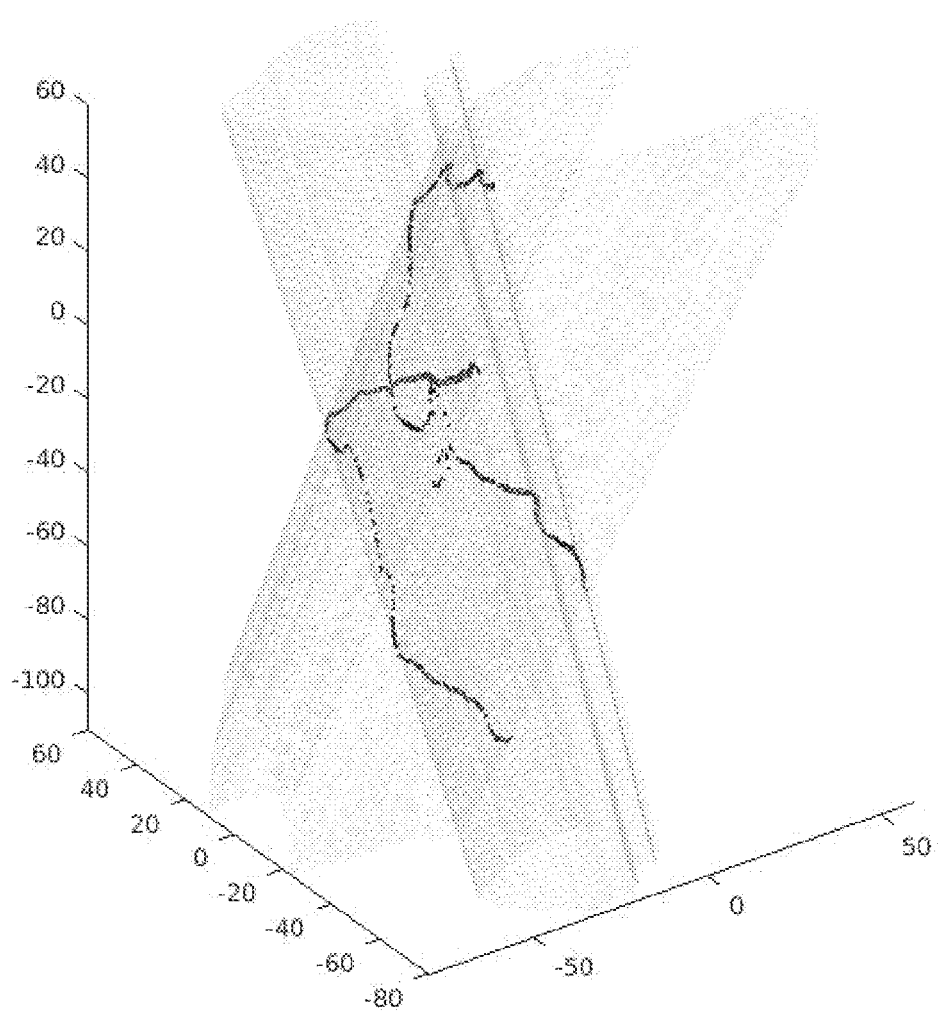
Figure 2A:
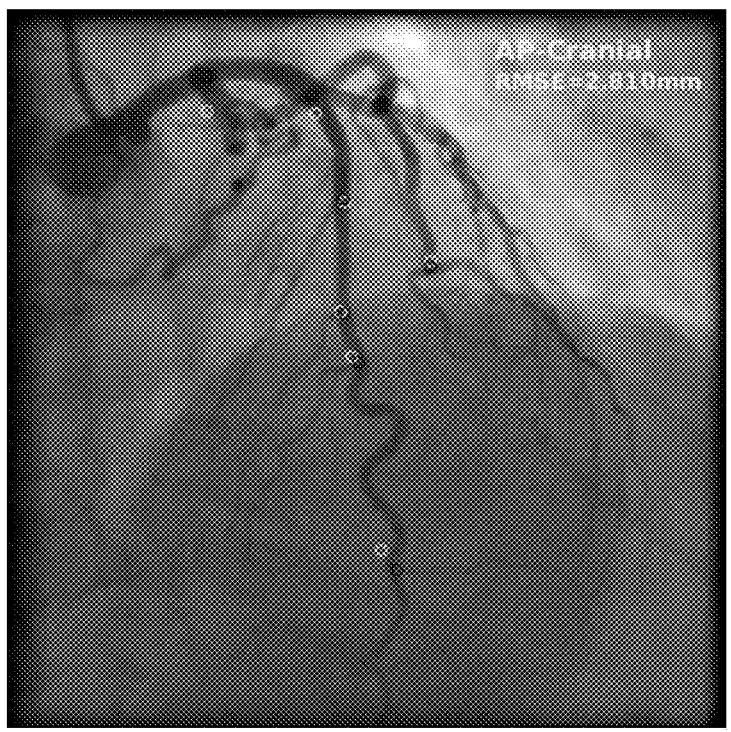
FIG. 2: Rigid-motion correction on two LCA image projections. White and black circles in the images mark, respectively, the rigid-motion corrected and true landmark locations. (A) Iteration 1. (B) Iteration 5. (C) At convergence.
Figure 2A:
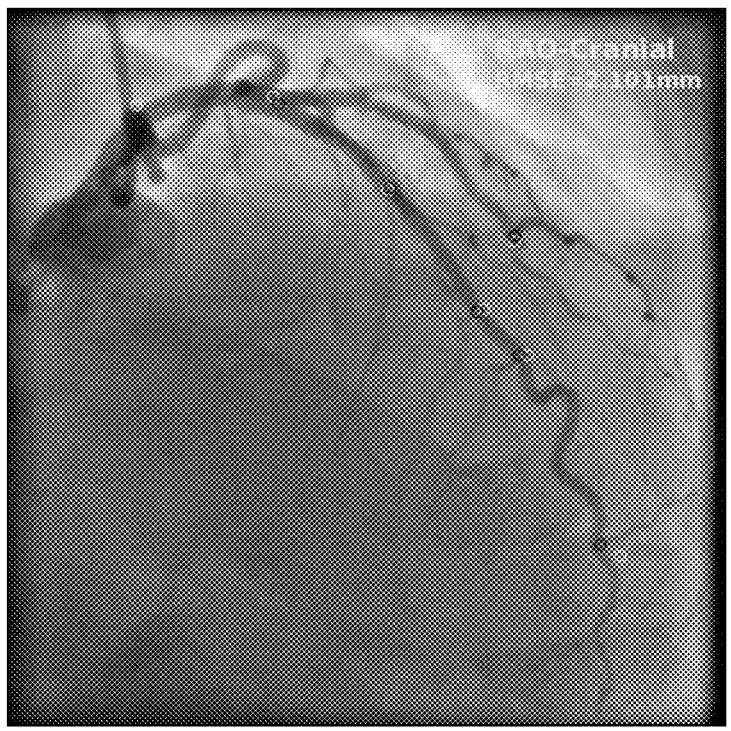
Figure 2B:
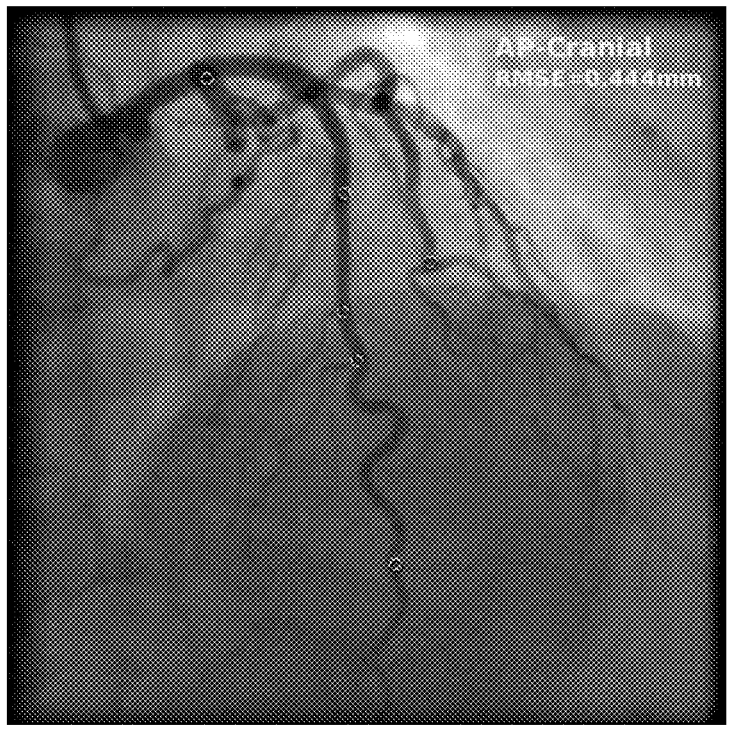
Figure 2B:
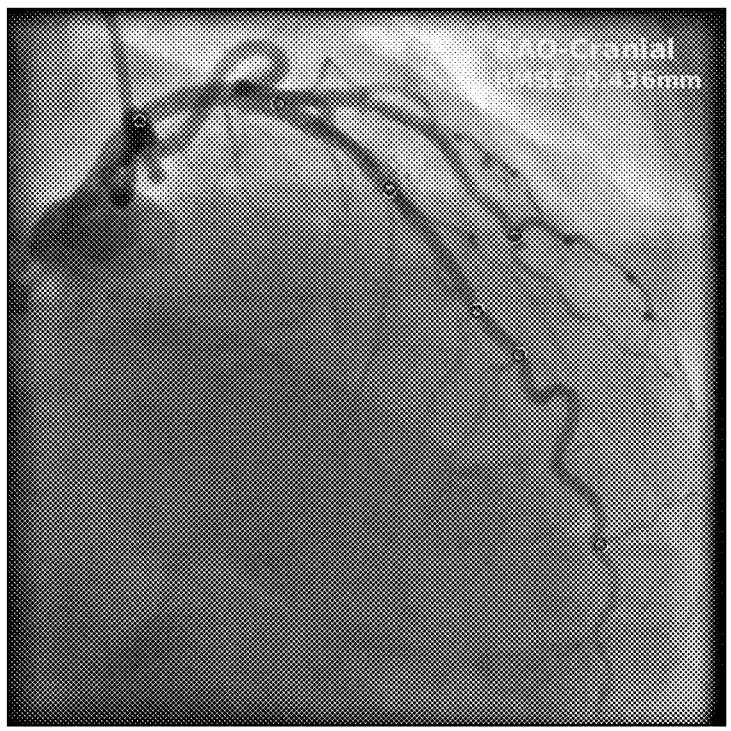
Figure 2C:
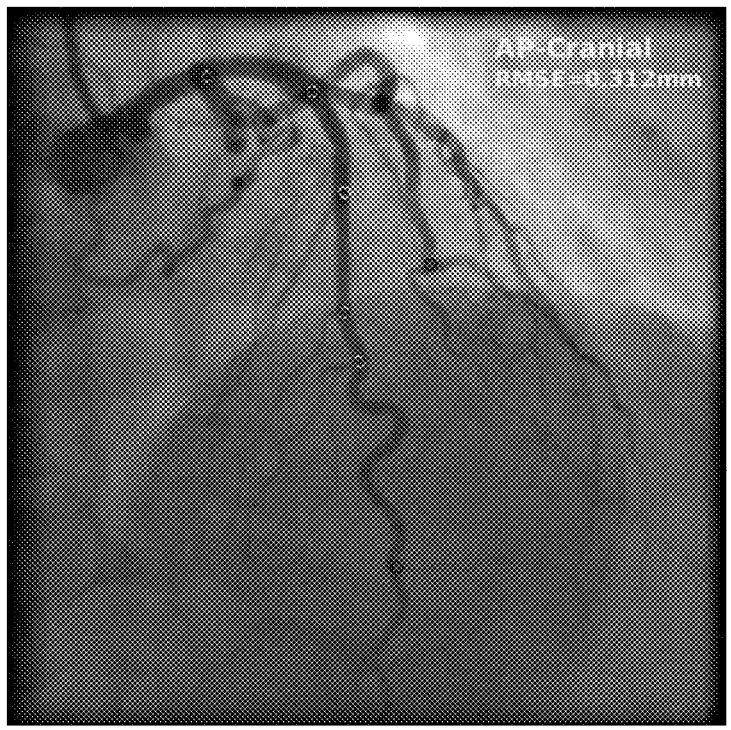
Figure 2C:
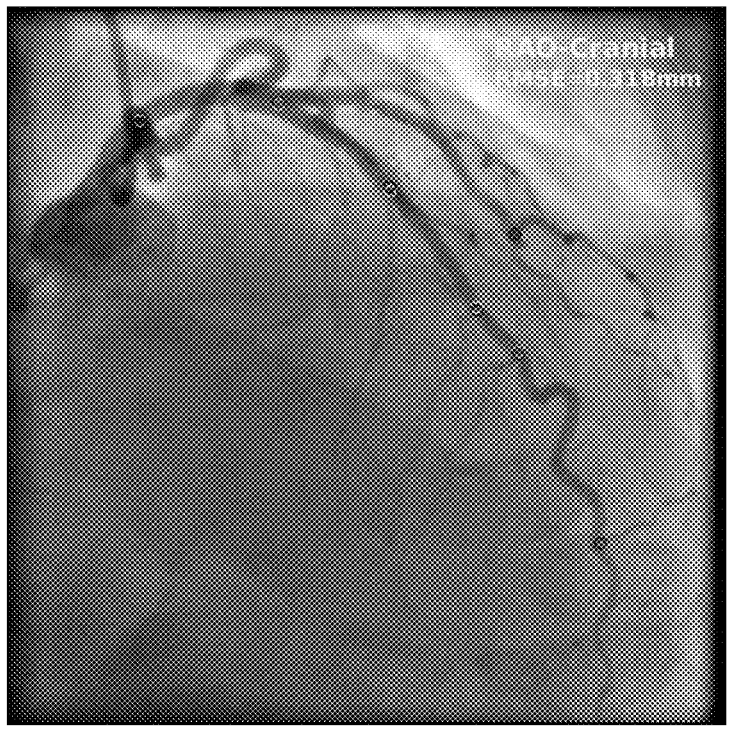

The present invention is further illustrated by the following Examples, in which parts and percentages are by weight and degrees are Celsius, unless otherwise stated. It should be understood that these Examples, while indicating preferred embodiments of the invention, are given by way of illustration only. From the above discussion and these Examples, one skilled in the art can ascertain the essential characteristics of this invention, and without departing from the spirit and scope thereof, can make various changes and modifications of the invention to adapt it to various usages and conditions. Thus, various modifications of the invention in addition to those shown and described herein will be apparent to those skilled in the art from the foregoing description. Such modifications are also intended to fall within the scope of the appended claims.

Example 1: Theoretical Proof of the Existence of Falsely-Reconstructed Vessel Segments Since the problem is mostly visible during reconstruction of curved vessels, a C-shaped curve is generated in the 3D space. A parabola is drawn in 2D plane (z=0) and then an arbitrary rotation is applied, which can mimic a C-shaped vessel, specifically the right coronary artery. Let, the curve be:

$$y^2 = ax. \tag{5}$$

So, in $\mathbb{R}^3$, it is represented as $$\begin{pmatrix} x \\ y \\ z \end{pmatrix} = \begin{pmatrix} \frac{y^2}{a} \\ y \\ 0 \end{pmatrix} = \frac{1}{a}\begin{pmatrix} y^2 \\ ay \\ 0 \end{pmatrix}. \tag{6}$$

To contain the curve in a finite-window, we assume $|y| \leq k$. Now, an arbitrary transformation R $$R = R_z(\gamma) R_y(\beta) R_x(\alpha) \tag{7}$$

is applied to the curve, which generates the final 3D object:

$$R \cdot \frac{1}{a}\begin{pmatrix} y^2 \\ ay \\ 0 \end{pmatrix} = A(y). \tag{8}$$

Let us now assume the X-ray source points be $S_1$ and $S_2$ the mid-points of the projection planes be $M_1$ and $M_2$, and the normals to the projection planes be $N_1$ and $N_2$.

For line passing through $S_1$ and A $$P_1 = S_1 + t_1(A - S_1). \tag{9}$$

Since $p_1$ lies on projection plane with mid-point $M_1$ and normal $N_1$, $$(P_1 - M_1) \cdot N_1 = 0$$

i.e. $(S_1 + t_1(A - S_1) - M_1) \cdot N_1 = 0$ i.e. $t_1 = \dfrac{(M_1 - S_1) \cdot N_1}{(A - S_1) \cdot N_1}.$ Similarly, for projection of A on plane $(M_2, N_2)$, $$t_2 = \frac{(M_2 - S_2) \cdot N_2}{(A - S_2) \cdot N_2}.$$

Hence, the eqns. of projected curves are given by:

$$q_1(y) = S_1 + \frac{(M_1 - S_1) \cdot N_1}{(A(y) - S_1) \cdot N_1}(A(y) - S_1) \tag{9}$$

$$q_2(y) = S_2 + \frac{(M_2 - S_2) \cdot N_2}{(A(y) - S_2) \cdot N_2}(A(y) - S_2) \tag{10}$$

Now, lines passing through source points and points on projected curves are given by:

$$f_1(y) = S_1 + d_1(q_1(y) - S_1) \tag{11}$$

i.e. $f_1(y) = S_1 + d_1 \dfrac{(M_1 - S_1) \cdot N_1}{(A(y) - S_1) \cdot N_1}(A(y) - S_1)$ $$f_2(y) = S_2 + d_2(q_2(y) - S_2) \tag{102}$$

i.e. $f_2(y) = S_2 + d_2 \dfrac{(M_2 - S_2) \cdot N_2}{(A(y) - S_2) \cdot N_2}(A(y) - S_2)$ In case of pointwise correspondence, $$f_1(y_1) = f_2(y_2) \tag{11}$$

i.e. $S_1 + d_1 \dfrac{(M_1 - S_1) \cdot N_1}{(A(y_1) - S_1) \cdot N_1}(A(y_1) - S_1) =$ $$S_2 + d_2 \frac{(M_2 - S_2) \cdot N_2}{(A(y) - S_2) \cdot N_2}(A(y_2) - S_2)$$

i.e. $\left( \dfrac{(M_1 - S_1) \cdot N_1}{(A(y_1) - S_1) \cdot N_1}(A(y_1) - S_1) \; - \; \dfrac{(M_2 - S_2) \cdot N_2}{(A(y) - S_2) \cdot N_2}(A(y_2) - S_2) \; (S_1 - S_2) \right)$ $$\begin{pmatrix} d_1 \\ d_2 \\ 1 \end{pmatrix} = 0$$

i.e. $\left| \dfrac{(M_1 - S_1) \cdot N_1}{(A(y_1) - S_1) \cdot N_1}(A(y_1) - S_1) - \dfrac{(M_2 - S_2) \cdot N_2}{(A(y) - S_2) \cdot N_2}(A(y_2) - S_2)(S_1 - S_2) \right| =$ 0 since $d_1, d_2 \neq 0$ i.e. $|(A(y_1) - S_1)(A(y_2) - S_2)(S_1 - S_2)| = 0$, since $$\frac{(M_1 - S_1) \cdot N_1}{(A(y_1) - S_1) \cdot N_1}, \; \frac{(M_2 - S_2) \cdot N_2}{(A(y) - S_2) \cdot N_2} \neq 0$$

i.e. $\left| R\begin{pmatrix} y_1^2 \\ ay_1 \\ 0 \end{pmatrix} - S_1 \; R\begin{pmatrix} y_2^2 \\ ay_2 \\ 0 \end{pmatrix} - S_2 \; S_1 - S_2 \right| = 0,$ $R = \dfrac{1}{a}R(\text{say}), |R| \neq 0$ i.e. $\left| \begin{pmatrix} y_1^2 \\ ay_1 \\ 0 \end{pmatrix} - R^{-1}S_1 \; \begin{pmatrix} y_2^2 \\ ay_2 \\ 0 \end{pmatrix} - R^{-1}S_2 \; R^{-1}(S_1 - S_2) \right| = 0$ i.e. $\begin{vmatrix} y_1^2 - (R^{-1}S_1)_1 & y_2^2 - (R^{-1}S_2)_1 & (R^{-1}S_1)_1 - (R^{-1}S_2)_1 \\ ay_1 - (R^{-1}S_1)_2 & ay_2 - (R^{-1}S_2)_2 & (R^{-1}S_1)_2 - (R^{-1}S_2)_2 \\ -(R^{-1}S_1)_3 & -(R^{-1}S_2)_3 & (R^{-1}S_1)_3 - (R^{-1}S_2)_3 \end{vmatrix} = 0$ i.e. $\begin{vmatrix} y_1^2 - (R^{-1}S_1)_1 & y_2^2 - y_1^2 & (R^{-1}S_1)_1 - (R^{-1}S_2)_1 \\ ay_1 - (R^{-1}S_1)_2 & ay_2 - ay_1 & (R^{-1}S_1)_2 - (R^{-1}S_2)_2 \\ -(R^{-1}S_1)_3 & 0 & (R^{-1}S_1)_3 - (R^{-1}S_2)_3 \end{vmatrix} = 0,$ $[C_2 = C_2 - C_1 - C_3]$ i.e. $(y_2 - y_1)\begin{vmatrix} y_1^2 - (R^{-1}S_1)_1 & y_2 + y_1 & (R^{-1}S_1)_1 - (R^{-1}S_2)_1 \\ ay_1 - (R^{-1}S_1)_2 & a & (R^{-1}S_1)_2 - (R^{-1}S_2)_2 \\ -(R^{-1}S_1)_3 & 0 & (R^{-1}S_1)_3 - (R^{-1}S_2)_3 \end{vmatrix} = 0$ -continued Hence, $y_2 = y_1$ or $$-ay_1y_2((R^{-1}S_1)_3 - (R^{-1}S_2)_3) +$$
$$(y_2 + y_1)((R^{-1}S_1)_3(R^{-1}S_2)_2 - (R^{-1}S_1)_2(R^{-1}S_2)_3) -$$
$$a((R^{-1}S_1)_3(R^{-1}S_2)_1 - (R^{-1}S_1)_1(R^{-1}S_2)_3) = 0 \quad (12)$$

i.e. $-ay_1y_2Q_1 + (y_2 + y_1)Q_2 - aQ_3 = 0$ i.e. $y_2 = \dfrac{aQ_3 - y_1Q_2}{Q_2 - ay_1Q_1}$ where $Q_1 = (R^{-1}S_1)_3 - (R^{-1}S_2)_3$, $Q_2 = (R^{-1}S_1)_3(R^{-1}S_2)_2 - (R^{-1}S_1)_2(R^{-1}S_2)_3$, and $Q_3 = (R^{-1}S_1)_3(R^{-1}S_2)_1 - (R^{-1}S_1)_1(R^{-1}S_2)_3$.

The second solution will exist if $$\left|\dfrac{aQ_3 - y_1Q_2}{Q_2 - ay_1Q_1}\right| \leq k$$

for $|y_1| \leq k$. In case, the 3D curve is quadratic in the initial X-Y plane, there will always exist a mathematically accurate but anatomically infeasible solution. Also, for higher even-order polynomial curves, at least one mathematically accurate but anatomically infeasible solution will always exist (assuming it lies within the finite window). However, these anatomically infeasible solutions may or may not exist for higher odd-order polynomial curves, since all other solutions can be imaginary.

Example 2: Performance of the Proposed Reconstruction Algorithm

The performance of the proposed reconstruction algorithm was qualitatively and quantitatively evaluated on 12 patients enrolled in clinical studies. The number of angiographic projections for RCA images were 2, while for LCA images, usually 4 image projections were available. The performance of the proposed CA tree reconstruction was compared with the reconstruction algorithm proposed by Galassi et al. [48].

A. Motion Correction

Figure 3:
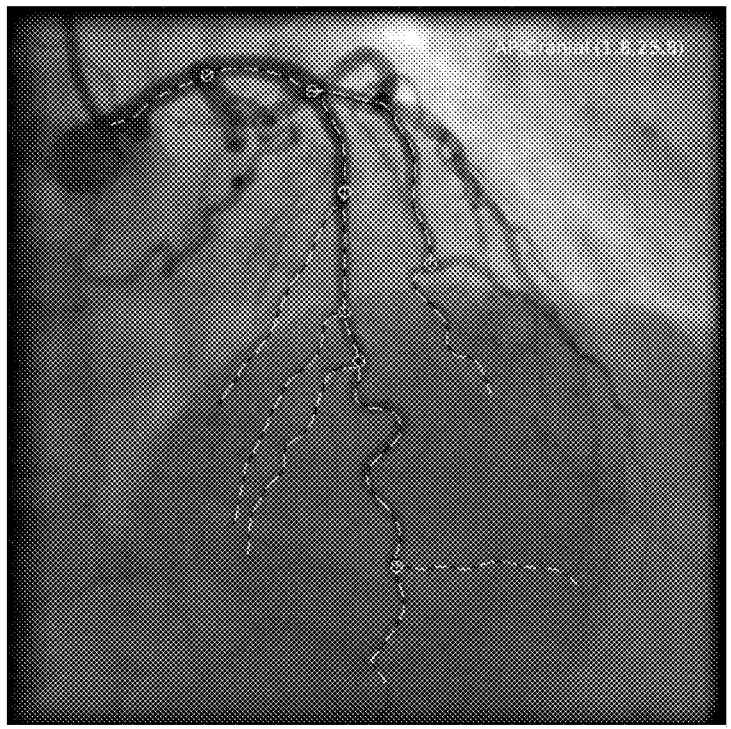
FIG. 3: Modelling non-rigid motion (black: original centerline, white broken: warped motion-corrected centerline).
Figure 3:
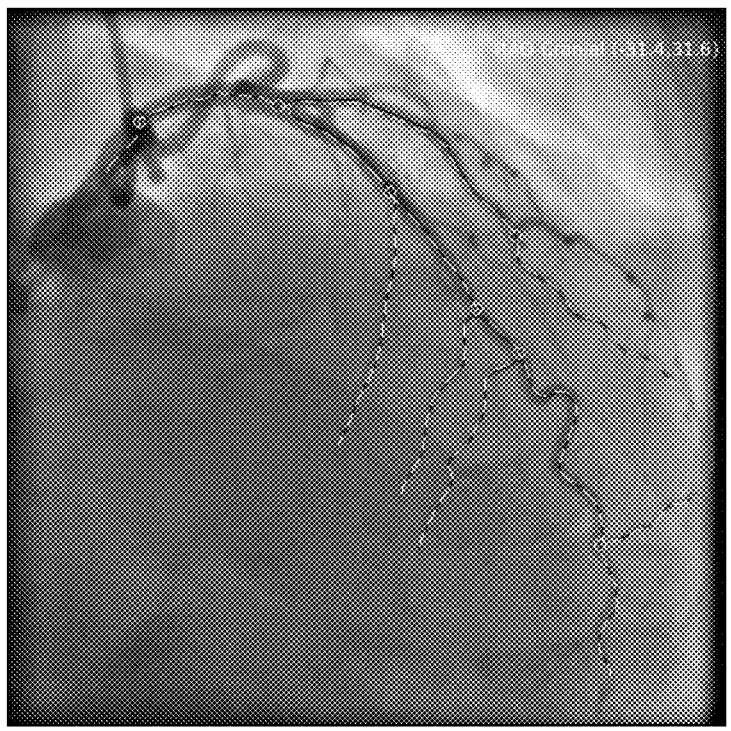
Figure 4:
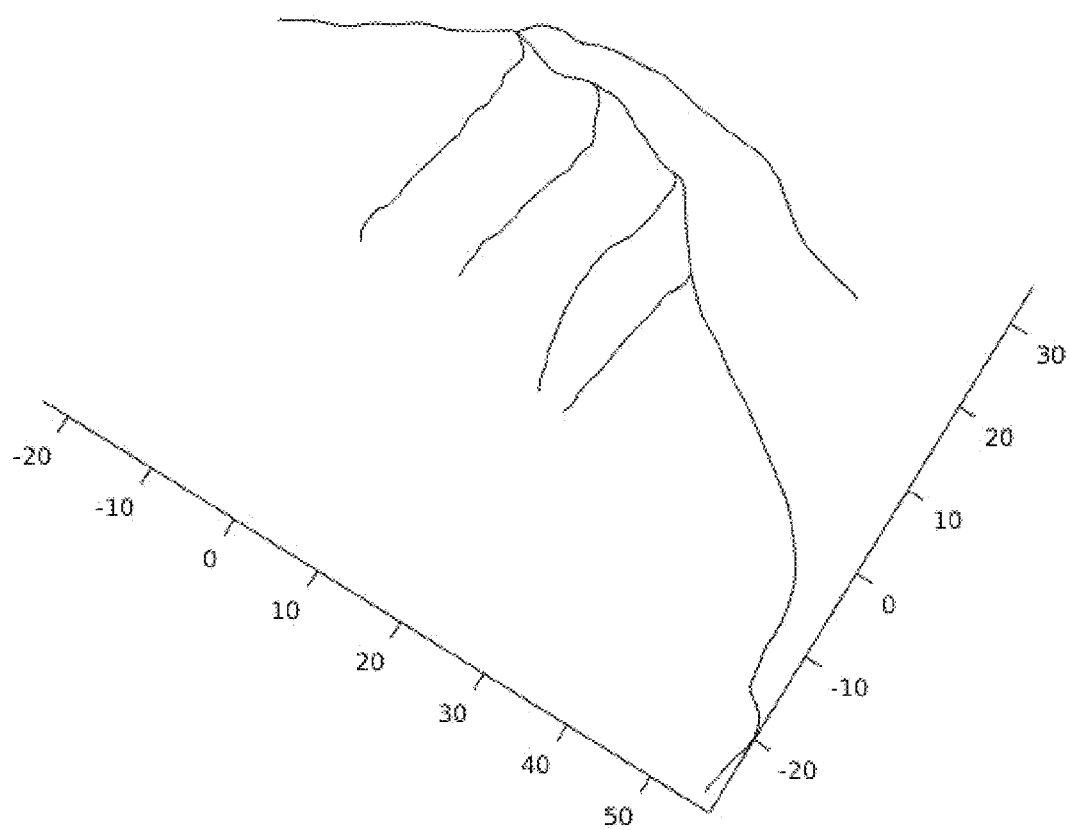
FIG. 4: Reconstructed 3D skeleton of left anterior descending (LAD) artery by proposed approach.
Figure 5A:
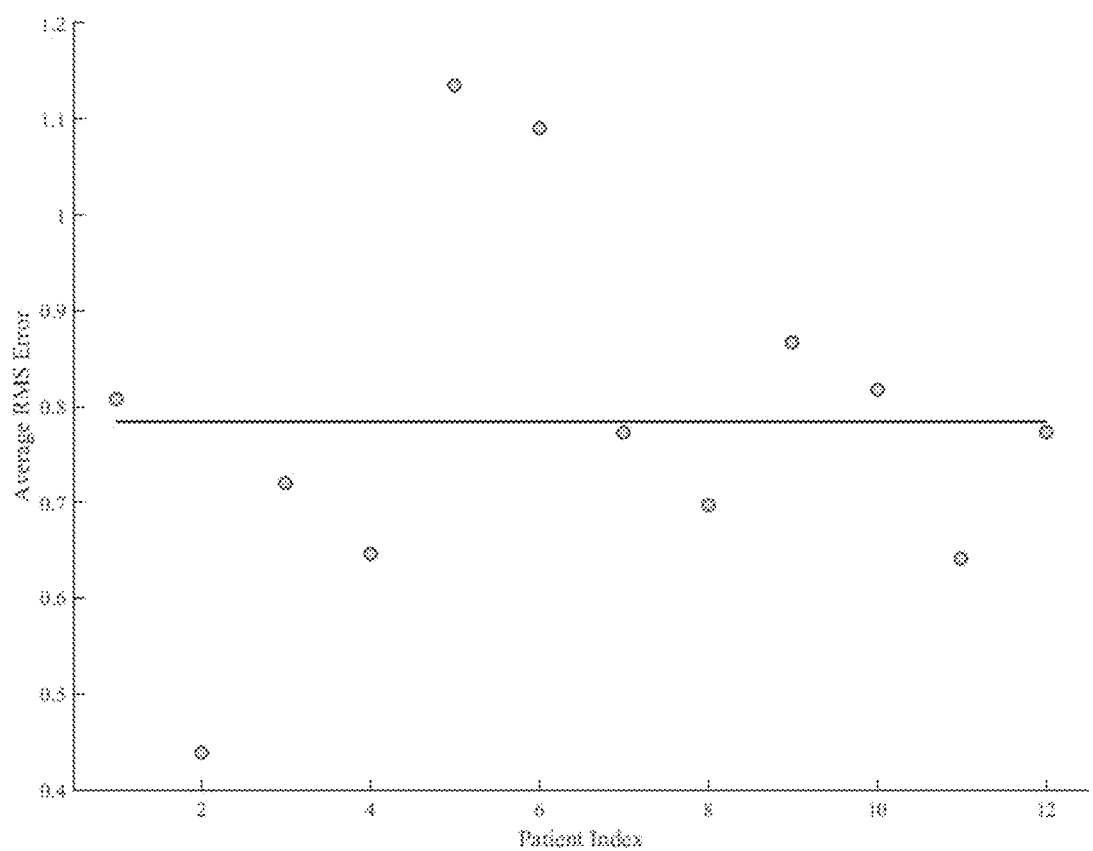
FIG. 5: Evaluating the rigid-motion correction: (A) RCA, (B) LCA. Grey circles represent average RMSE for each patient, while black line represents the average over all patients.
Figure 5B:
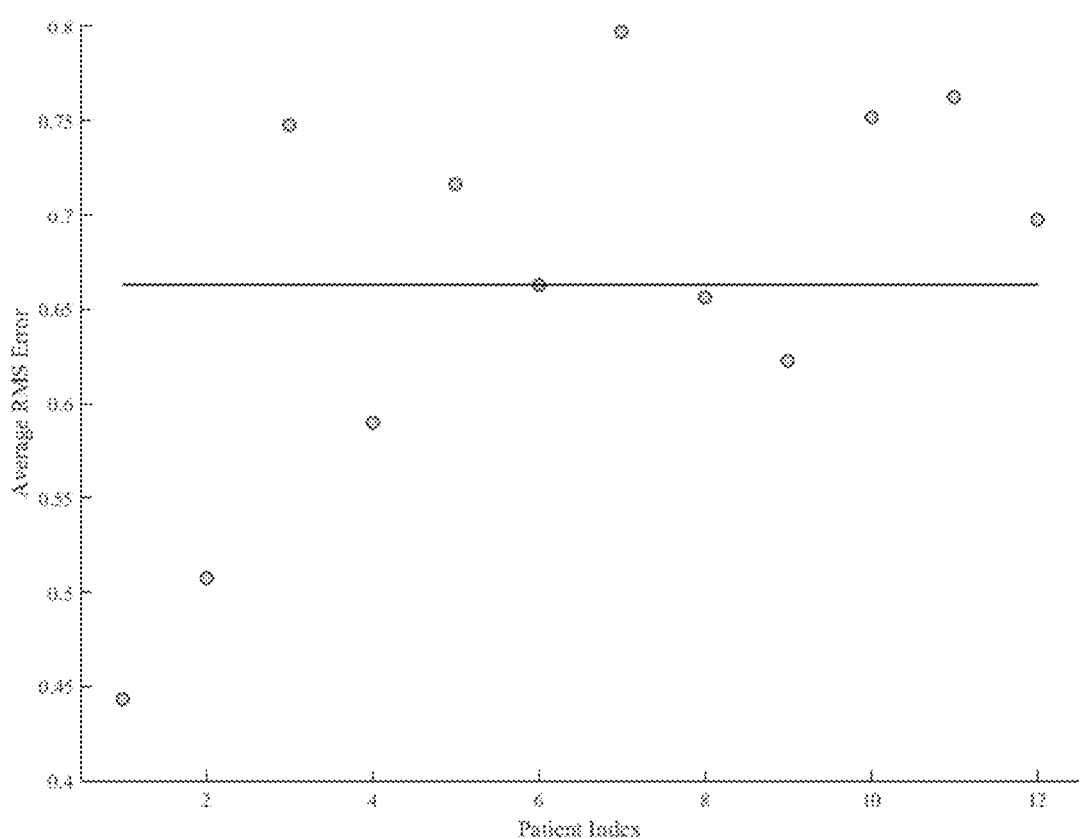

The qualitative performance of the proposed rigid-motion correction on two LCA image projections is depicted in FIG. 2. The algorithm usually converges in 8-12 iterations (maximum 20). The performance of the method was quantitatively evaluated by comparing the 2D locations of landmark points (in this case, bifurcation points) in each plane with the back-projected locations of motion-corrected 3D landmark points. For quantitative validation, the average root-mean square (rms) errors or the average reprojection errors for landmark points in an image were measured and the results are presented in FIG. 5, separately for RCA and LCA. The average rms error for 12 RCA cases was 0.784 mm, while the same for 12 LCA cases was 0.663 mm. Together, the average rms error for all cases was 0.7235 mm. After the rigid motion correction, the 2D centerlines of each projection plane were warped to correct the remaining non-rigid deformation, as qualitatively depicted in FIG. 3.

B. 3D Centerline Reconstruction

Figure 6:
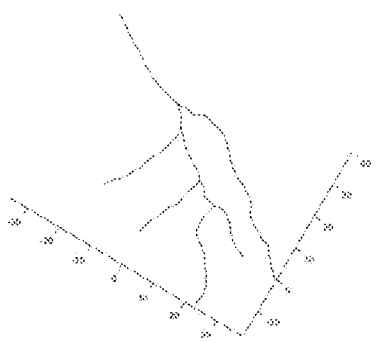
FIG. 6: From left to right: 3D centerline and back-projection of centerline on original image planes.
Figure 6:
Figure 6:
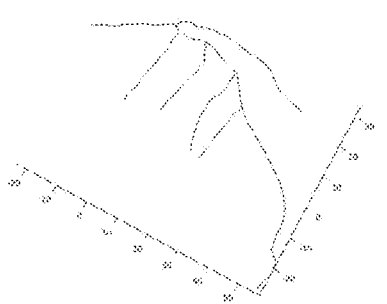
Figure 6:
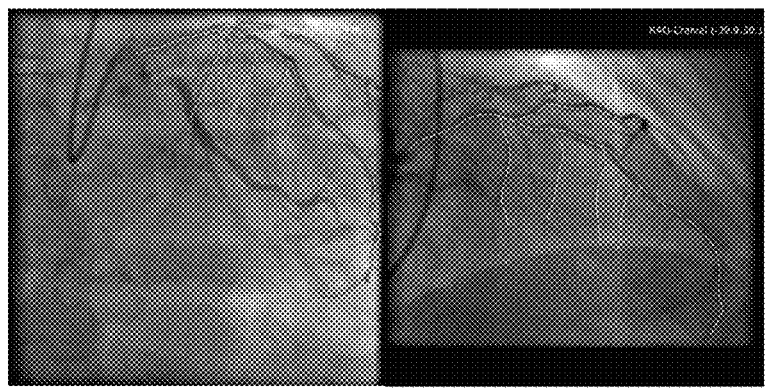
Figure 6:
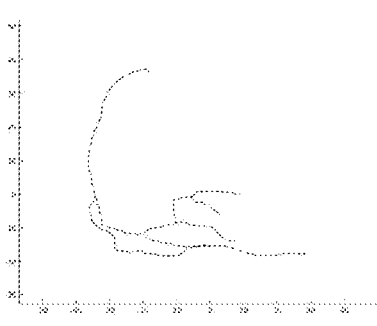
Figure 6:
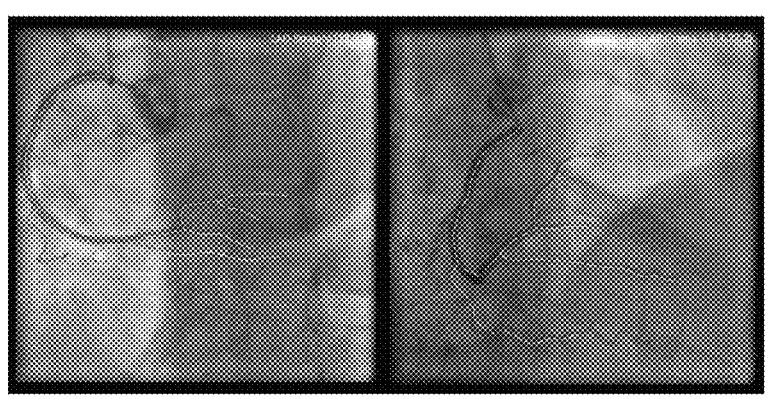
Figure 7:
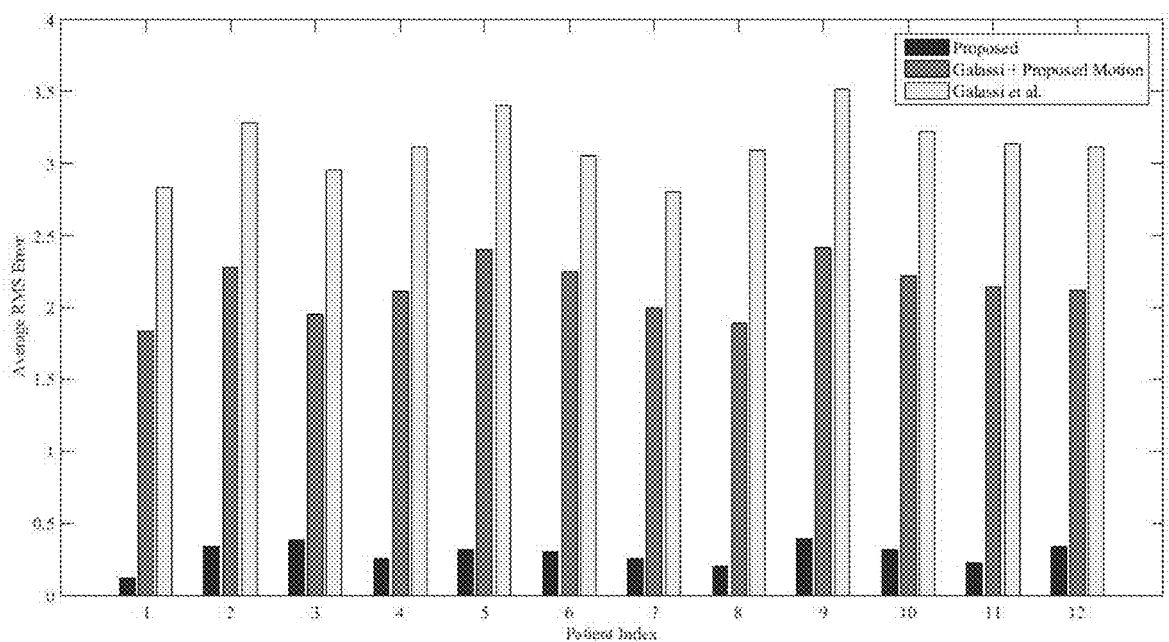
FIG. 7: Evaluating the 3D centerline reconstruction on RCA and LCA images: (A) RCA, (B) LCA.
Figure 7:
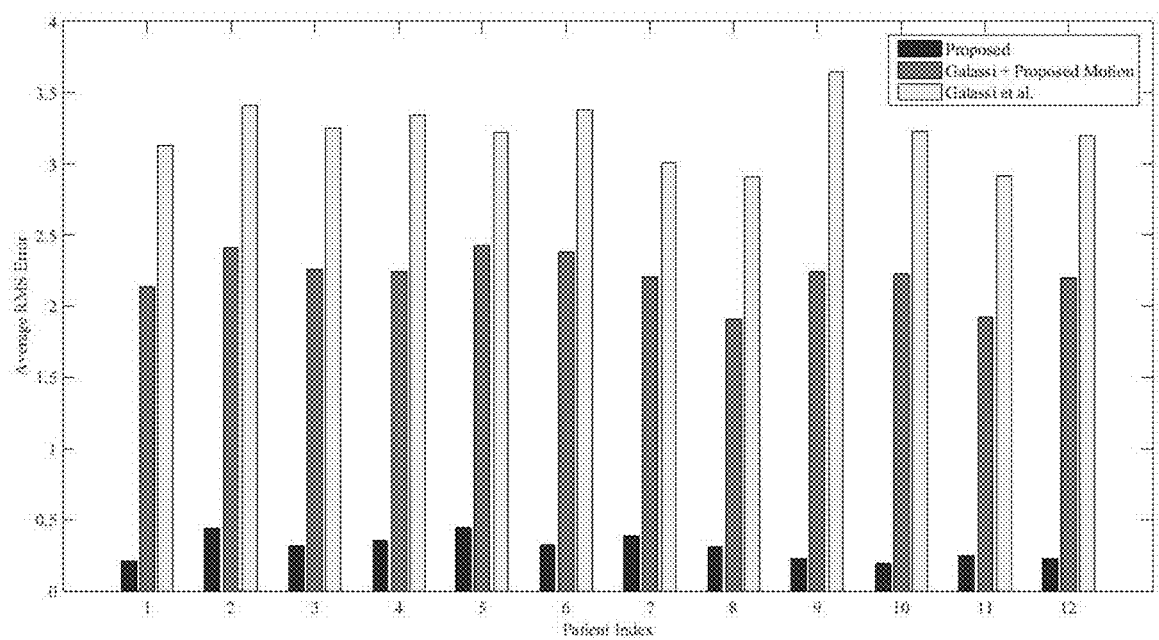

The performance of the 3D centerline reconstruction was evaluated by comparing the projected 3D centerlines on each plane with the original 2D centerlines (FIG. 6). The performance was quantitatively measured using the average rms error and presented in FIG. 7. From the results, it is observed that the proposed 3D centerline reconstruction produces average rms value 0.286 mm for 12 RCA cases and 0.3049 mm for 12 LCA cases.

The reconstruction performance was compared with a recently-developed 3D CA reconstruction algorithm by Galassi et al. [48], showing a substantial reduction in matching error. We performed non-parametric Wilcoxon signed rank and parametric paired-t tests, both showing the improvement to be statistically significant (p-value=5.96e-08 and 4.4e-15). To compare the performance of only 3D centerlines reconstruction, the reconstruction algorithm by Galassi et al. [48] was also applied on the images which were motion-corrected by the proposed algorithm and the performance was quantitatively evaluated on all 12 patients. The proposed motion correction improved the performance of the 3D reconstruction by Galassi et al., and the improvement in reconstruction performance by the proposed point-cloud based 3D centerlines reconstruction was statistically significant.

C. Validation Over Projection Planes not Used for 3D Reconstruction

Figure 8:
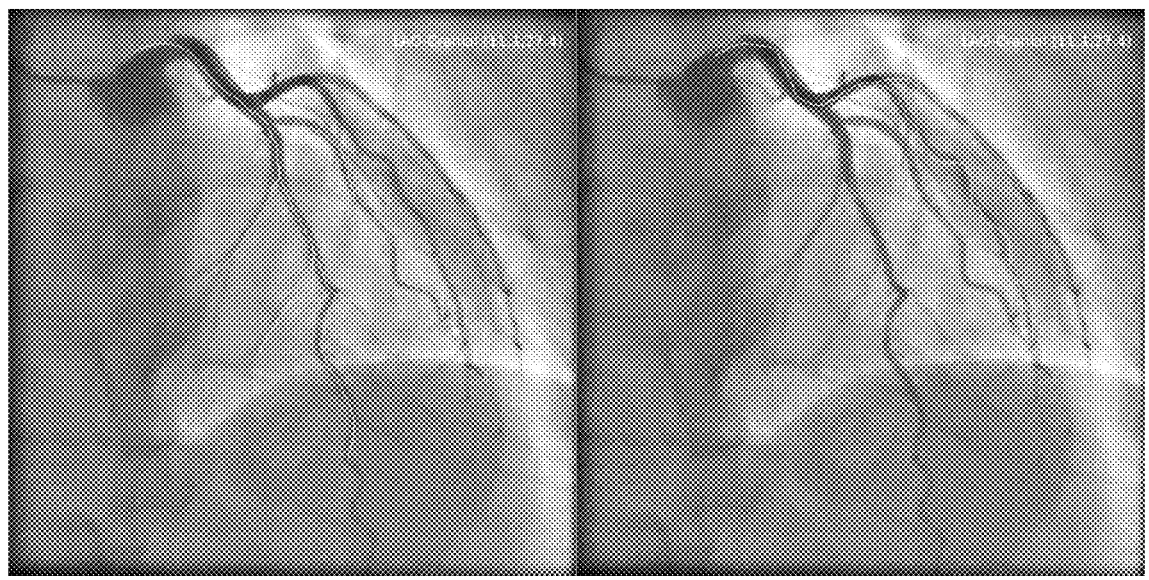
FIG. 8: Back-projection over projection planes not used for 3D reconstruction.
Figure 9:
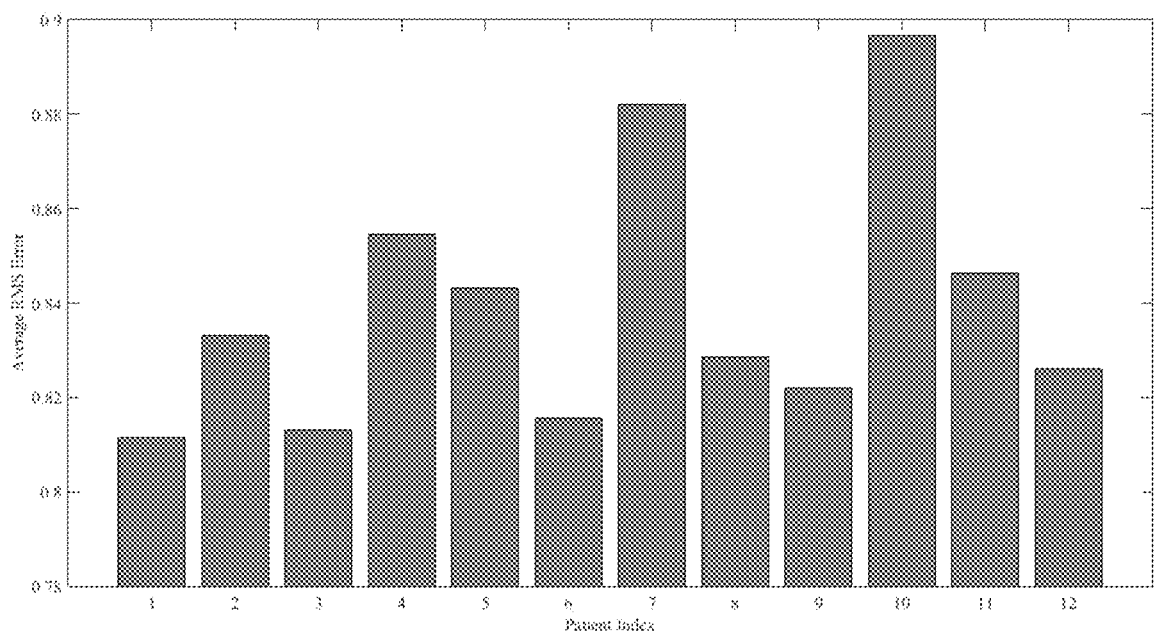
FIG. 9: Validation over projection planes not used for 3D reconstruction.
Figure 10:
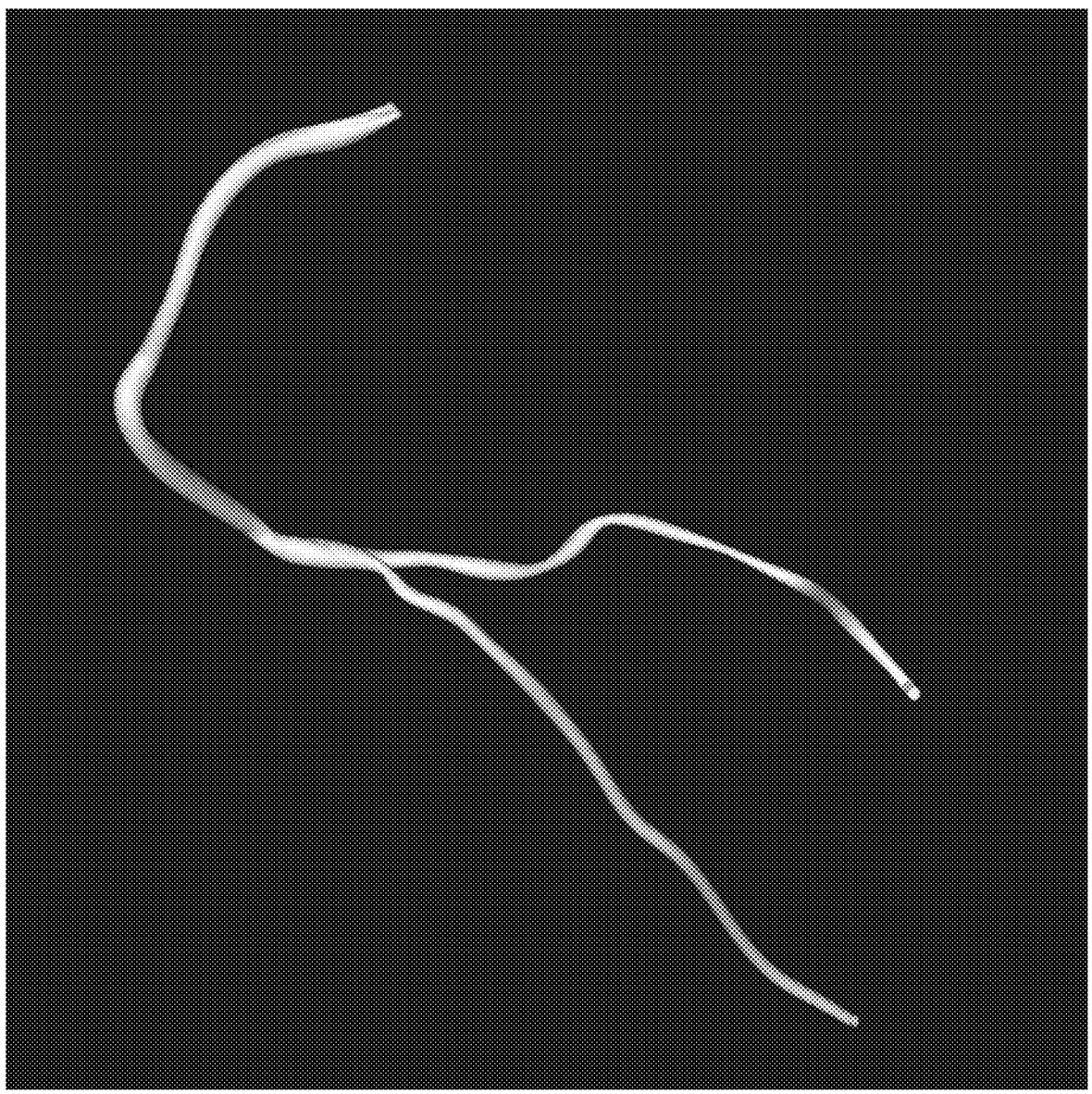
FIG. 10: Complete coronary arterial tree of right coronary artery.
Figure 11:
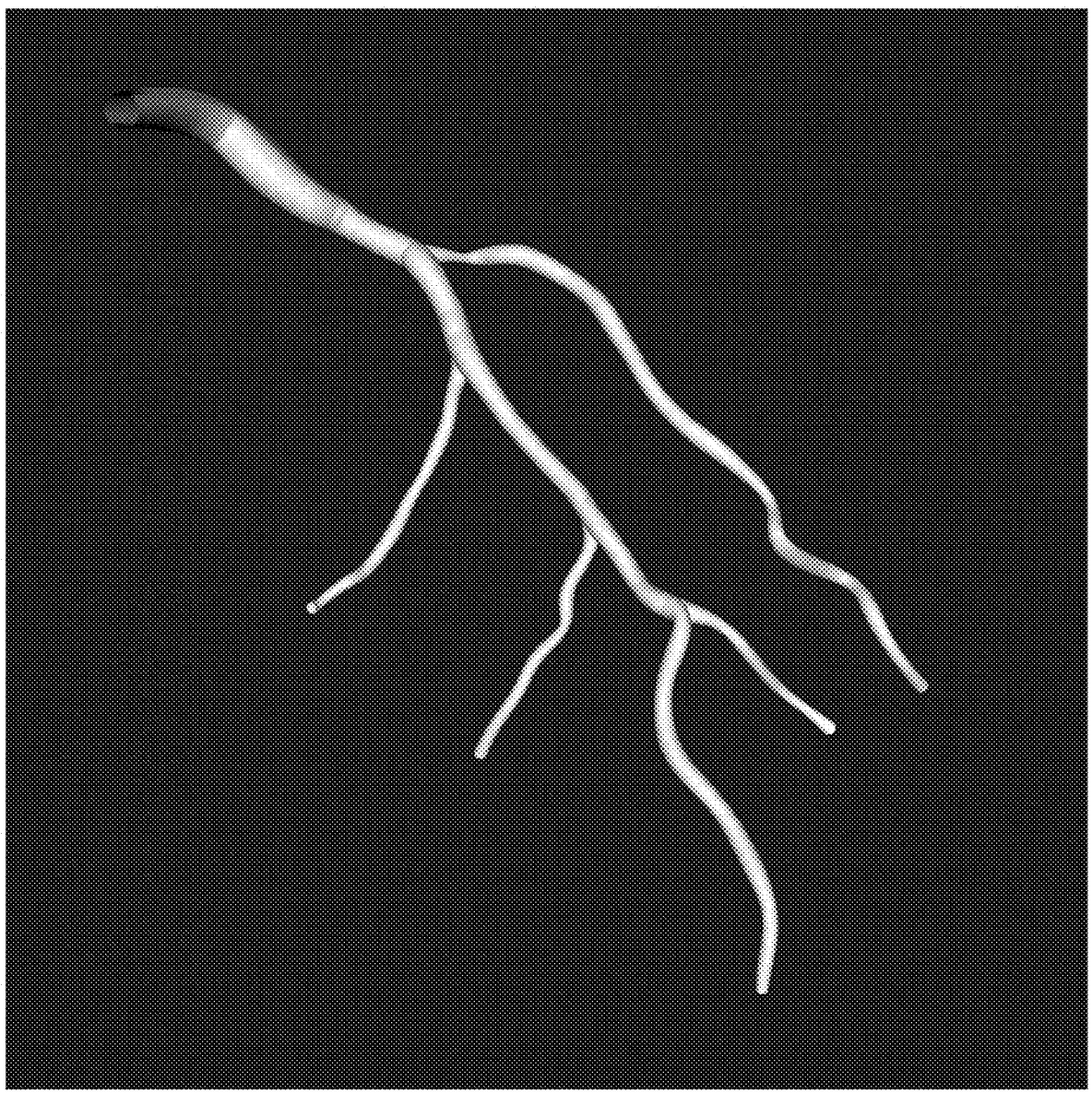
FIG. 11: Complete coronary arterial tree of left anterior descending (LAD) artery.
Figure 12:
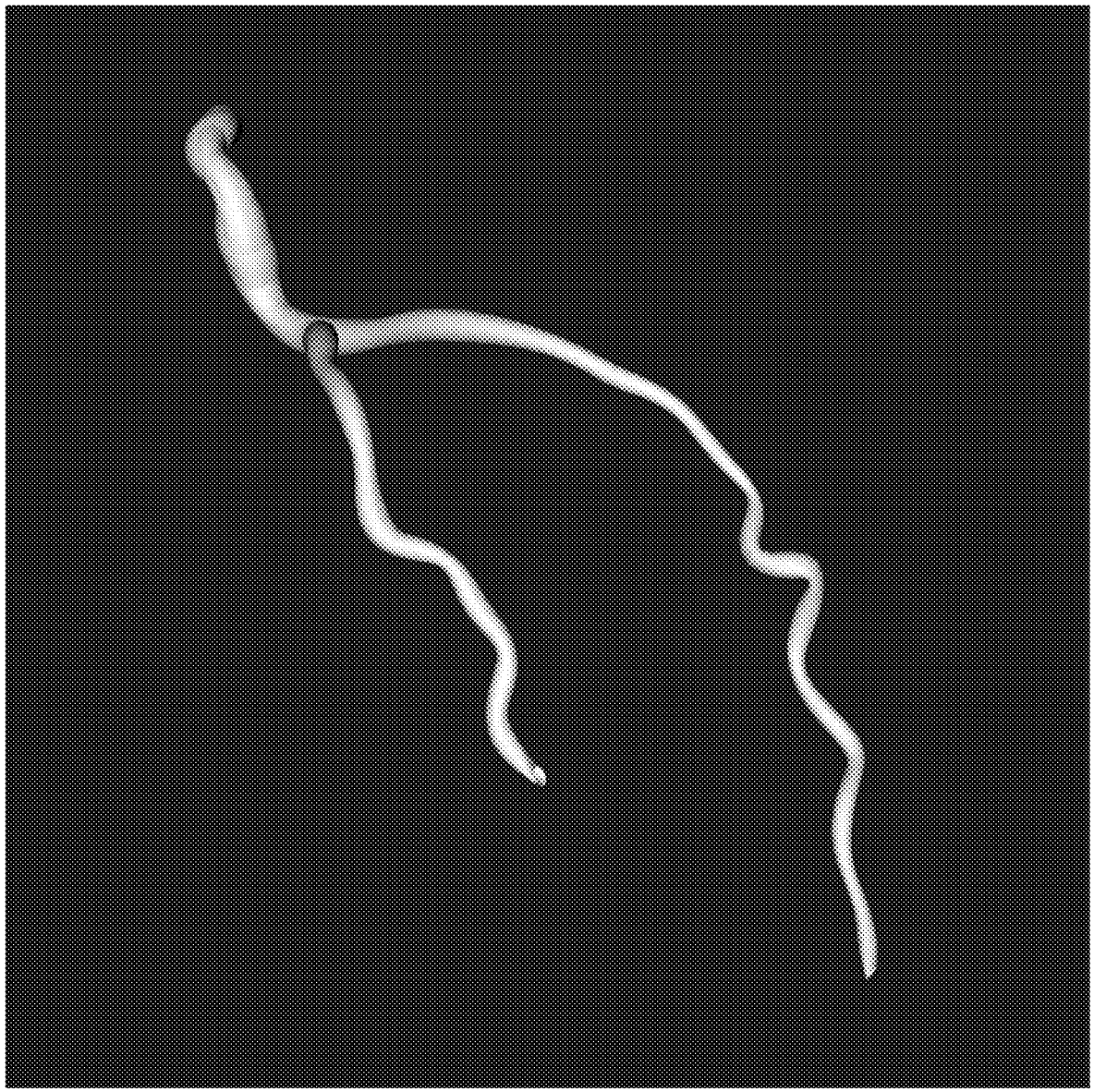
FIG. 12: Complete coronary arterial tree of left circumflex (LCx) artery.
Figure 13:
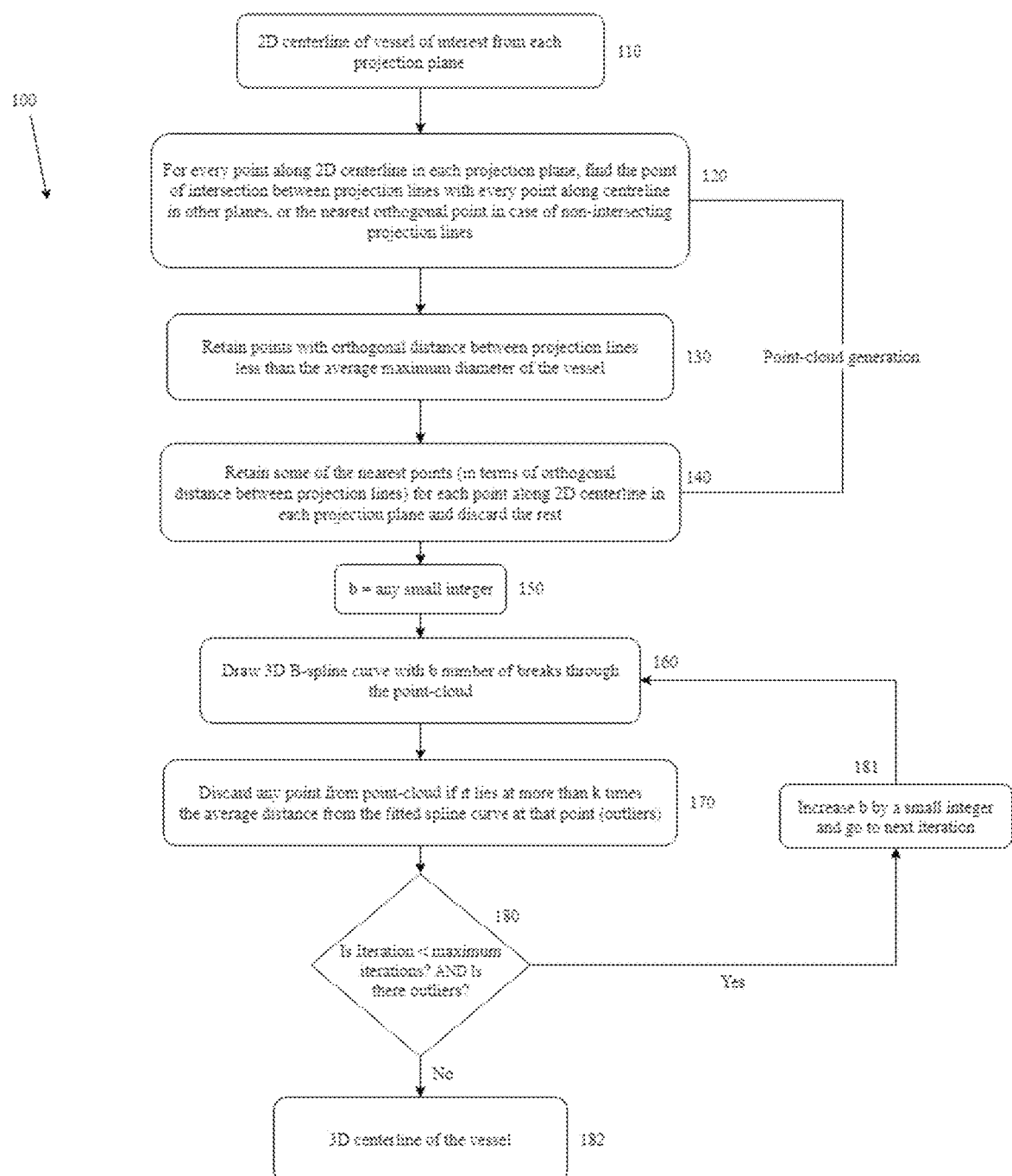
FIG. 13: Flow chart illustrating one embodiment of the method of the invention.
Figure 14:
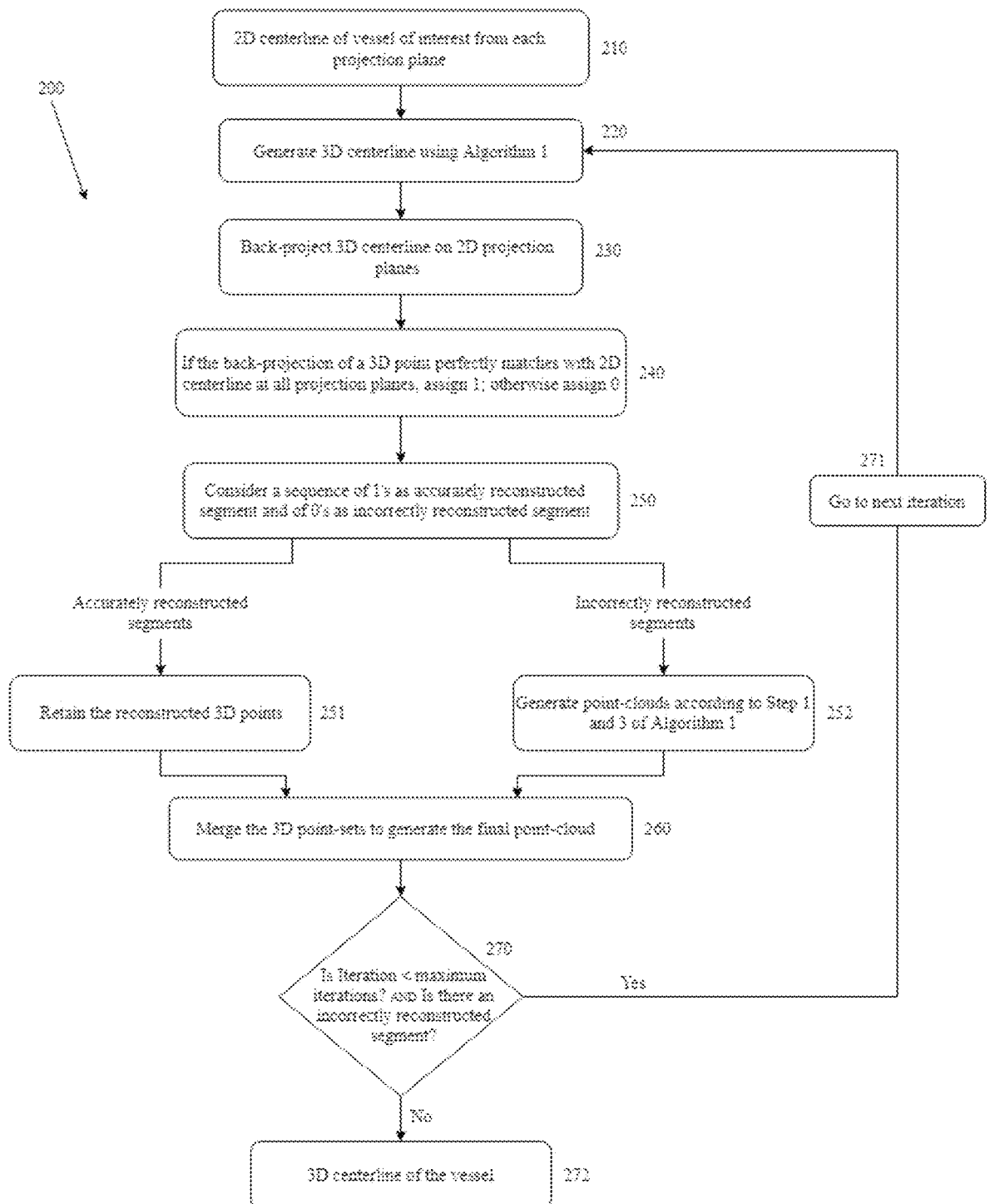
FIG. 14: Flow chart illustrating the back-projection method of one embodiment of the invention.
Figure 15:
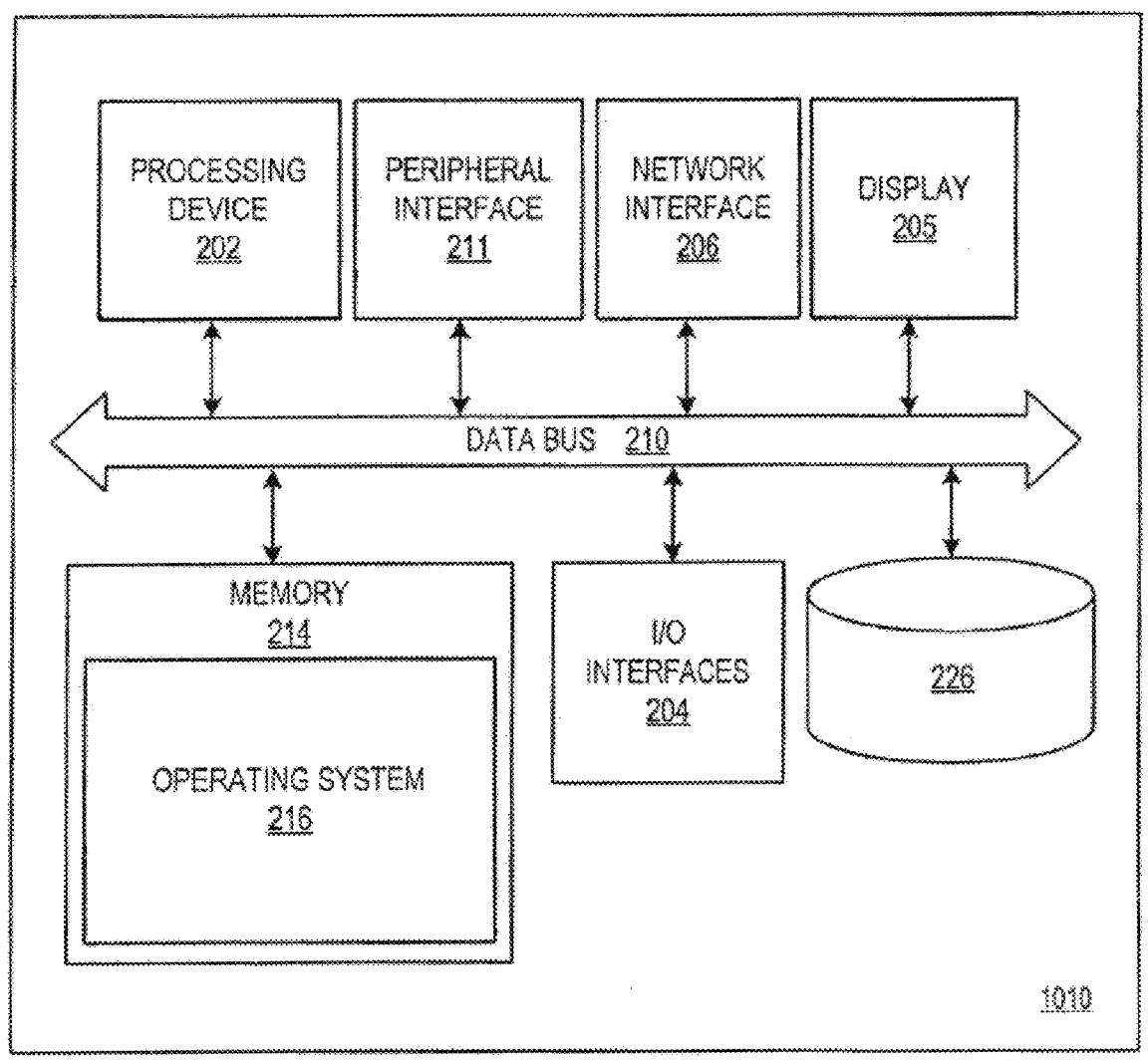
FIG. 15: A schematic block diagram of an apparatus in which embodiments of the methods disclosed herein may be implemented.

The performance of the 3D centerlines reconstruction was also demonstrated by back-projecting the centerlines on a projection plane that was not used during the 3D reconstruction step. The results are qualitatively depicted in FIG. 8, while the quantitative results are provided in FIG. 9. From these results, it is clear that, even without using any information from that projection plane, the proposed reconstruction algorithm is able to produce the centerlines on that image plane with an average reprojection error of 0.8263 mm. (The validation over projection planes not used for 3D Reconstruction was only analysed over LCA images, since, for RCA images, more than 2 projections were not available.)

REFERENCES

[1] D. B. Mark, D. S. Berman, M. J. Budoff, J. J. Carr, T. C. Gerber, H. S. Hecht, et al., "Accf/acr/aha/nasci/saip/scai/scct 2010 expert consensus document on coronary computed tomographic angiography: A report of the american college of cardiology foundation task force on expert consensus documents," *Journal of the American College of Cardiology*, vol. 55, no. 23, pp. 2663-2699, 2010.

[2] M. H. Eng, P. A. Hudson, A. J. Klein, S. J. Chen, M. S. Kim, B. M. Groves, et al., "Impact of Three Dimensional In-Room Imaging (3DCA) in the Facilitation of Percutaneous Coronary Interventions," *Journal of Cardiology and Vascular Medicine*, vol. 1, pp. 1-5, 2013.

[3] S. Çimen, A. Gooya, M. Grass, and A. F. Frangi, "Reconstruction of Coronary Arteries from X-Ray Angiography: A Review," *Medical Image Analysis*, vol. 32, pp. 46-68, 2016.

[4] S. J. Chen and D. Schäfer, "Three-Dimensional Coronary Visualization, Part 1: Modeling," *Cardiology Clinics*, vol. 27, no. 3, pp. 433-452, 2009.

[5] G. Schoonenberg, A. Neubauer, and M. Grass, "Three-Dimensional Coronary Visualization, Part 2: 3D Reconstruction," *Cardiology Clinics*, vol. 27, no. 3, pp. 453-465, 2009.

[6] K. Wiesent, K. Barth, N. Navab, P. Durlak, T. Brunner, O. Schuetz, and W. Seissler, "Enhanced 3-D-Reconstruction Algorithm for C-arm Systems Suitable for Interventional Procedures," *IEEE Transactions on Medical Imaging*, vol. 19, no. 5, pp. 391-403, 2000.

[7] R. Fahrig, A. J. Fox, S. Lownie, and D. W. Holdsworth, "Use of a C-arm System to Generate True Three-Dimensional Computed Rotational Angiograms: Preliminary in Vitro and in Vivo Results," *American Journal of Neuroradiology*, vol. 18, no. 8, pp. 1507-1514, 1997.

[8] C. Cañero, F. Vilariño, J. Mauri, and P. Radeva, "Predictive (Un)distortion Model and 3-D Reconstruction by Biplane Snakes," *IEEE Transactions on Medical Imaging*, vol. 21, no. 9, pp. 1188-1201, 2002.

[9] W. Cong, J. Yang, D. Ai, Y. Chen, Y. Liu, and Y. Wang, "Quantitative Analysis of Deformable Model-Based 3-D Reconstruction of Coronary Artery from Multiple Angiograms," *IEEE Transactions on Biomedical Engineering*, vol. 62, no. 8, pp. 2079-2090, 2015.

[10] C. Blondel, R. Vaillant, F. Devernay, G. Malandain, and N. Ayache, "Automatic Trinocular 3D Reconstruction of Coronary Artery Centerlines from Rotational X-Ray Angiography," in *Proceedings of the 16th International Congress and Exhibition on Computer Assisted Radiology and Surgery (CARS)*, 2002, pp. 832-837.

[11] A. M. Vukicevic, S. Çimen, N. Jagic, G. Jovicic, et al., "Three-Dimensional Reconstruction and NURBS-Based Structured Meshing of Coronary Arteries from the Conventional X-Ray Angiography Projection Images," *Scientific Reports*, vol. 8, no. 1711, 2018.

[12] A. Holland, J. Goldfarb, and R. Edelman, "Diaphragmatic and Cardiac Motion During Suspended Breathing: Preliminary Experience and Implications for Breath-hold MR Imaging," *Radiology*, vol. 209, no. 2, pp. 483-489, 1998.

[13] G. Shechter, J. R. Resar, and E. R. McVeigh, "Displacement and Velocity of the Coronary Arteries: Cardiac and Respiratory Motion," *IEEE Transactions on Medical Imaging*, vol. 25, no. 3, pp. 369-375, 2006.

[14] L. Husmann, S. Leschka, L. Desbiolles, T. Schepis, et al., "Coronary Artery Motion and Cardiac Phases: Dependency on Heart Rate—Implications for CT Image Reconstruction," *Radiology*, vol. 245, no. 2, pp. 567-576, 2007.

[15] A. Banerjee, R. K. Kharbanda, R. P. Choudhury, and V. Grau, "Automated Motion Correction and 3D Vessel Centerlines Reconstruction from Non-Simultaneous Angiographic Projections," in *Proceedings of the 9th International Workshop on Statistical Atlases and Computational Models of the Heart*, 2018, pp. 1-9.

[16] N. Guggenheim, P. A. Doriot, P. A. Dorsaz, P. Descouts, and W. Rutishauser, "Spatial Reconstruction of Coronary Arteries from Angiographic Images," *Physics in Medicine & Biology*, vol. 36, no. 1, pp. 99-110, 1991.

[17] Z. Ding and M. H. Friedman, "Quantification of 3-D Coronary Arterial Motion Using Clinical Biplane Cineangiograms," *The International Journal of Cardiac Imaging*, vol. 16, no. 5, pp. 331-346, 2000.

[18] P. Windyga, M. Garreau, H. LeBreton, and J. L. Coatrieux, "2D and 3D Knowledge Combination for the Reconstruction of Coronary Arteries: First Results on Real Data," in *Proceedings of the 16th Annual International Conference of the IEEE Engineering in Medicine and Biology Society (EMBS)*, 1994, pp. 620-621.

[19] N. Navab, A. Bani-Hashemi, M. S. Nadar, K. Wiesent, et al., "3D Reconstruction from Projection Matrices in a C-arm Based 3DAngiography System," in *Proceedings of the First International Conference on Medical Image Computing and Computer-Assisted Intervention (MICCAI)*, 1998, pp. 119-129.

[20] E. Bullitt, A. Liu, and S. M. Pizer, "Three-Dimensional Reconstruction of Curves from Pairs of Projection Views in the Presence of Error. I. Algorithms," *Medical Physics*, vol. 24, no. 11, pp. 1671-1678, 1997.

[21] E. Bullitt, A. Liu, and S. M. Pizer, "Three-Dimensional Reconstruction of Curves from Pairs of Projection Views in the Presence of Error. II. Analysis of Error," *Medical Physics*, vol. 24, no. 11, pp. 1679-1687, 1997.

[22] A. K. W. Law, H. Zhu, and F. H. Y. Chan, "3D Reconstruction of Coronary Artery using Biplane Angiography," in *Proceedings of the 25th Annual International Conference of the IEEE Engineering in Medicine and Biology Society (EMBS)*, 2003, pp. 533-536.

[23] C. Sbert and A. F. Sole, "3D Curves Reconstruction Based on Deformable Models," *Journal of Mathematical Imaging and Vision*, vol. 18, no. 3, pp. 211-223, 2003.

[24] S.-Y. J. Chen and J. D. Carroll, "3-D Reconstruction of Coronary Arterial Tree to Optimize Angiographic Visualization," *IEEE Transactions on Medical Imaging*, vol. 19, no. 4, pp. 318-336, 2000.

[25] S.-Y. J. Chen, K. R. Hoffmann, and J. D. Carroll, "Three-Dimensional Reconstruction of Coronary Arterial Tree Based on Biplane Angiograms," in *Proceedings of the SPIE Medical Imaging: Image Processing*, vol. 2710, 1996, pp. 103-114.

[26] S.-Y. J. Chen and C. E. Metz, "Improved Determination of Biplane Imaging Geometry from Two Projection Images and its Application to 3D Reconstruction of Coronary Arterial Trees," *Medical Physics*, vol. 24, no. 5, pp. 633-654, 1997.

[27] A. Zifan, P. Liatsis, P. Kantartzis, M. Gavaises, N. Karcanias, and D. Katritsis, "Automatic 3D Reconstruction of Coronary Artery Centerlines from Monoplane X-Ray Angiogram Images," *International Journal of Medical and Health Sciences*, vol. 2, no. 3, pp. 105-110, 2008.

[28] J. Sethian, *Fast Marching Methods and Level Set Methods: Evolving Interfaces in Computational Geometry, Fluid Mechanics, Computer Vision and Materials Sciences*. Cambridge University Press, 1999.

[29] A. F. Frangi, W. J. Niessen, K. L. Vincken, and M. A. Viergever, "Multiscale Vessel Enhancement Filtering," in *Proceedings of the First International Conference on Medical Image Computing and Computer-Assisted Intervention (MICCAI)*, 1998, pp. 130-137.

[30] J. F. Canny, "Finding Edges and Lines in Images," MIT Artificial Intelligence Lab, Technical Report 720, 1983.

[31] P. S. P. Wang and Y. Y. Zhang, "A Fast and Flexible Thinning Algorithm," *IEEE Transactions on Computers*, vol. 38, no. 5, pp. 741-745, 1989.

[32] J. Y. Goulermas and P. Liatsis, "Hybrid Symbiotic Genetic Optimisation for Robust Edge-Based Stereo Correspondence," *Pattern Recognition*, vol. 34, no. 12, pp. 2477-2496, 2001.

[33] C. Blondel, G. Malandain, R. Vaillant, and N. Ayache, "4D Deformation Field of Coronary Arteries from Monoplane Rotational X-Ray Angiography," in *Proceedings of the 17th International Congress and Exhibition on Computer Assisted Radiology and Surgery (CARS)*, 2003, pp. 1073-1078.

[34] C. Blondel, R. Vaillant, G. Malandain, and N. Ayache, "3D Tomographic Reconstruction of Coronary Arteries Using a Precomputed 4D Motion Field," *Physics in Medicine & Biology*, vol. 49, no. 11, pp. 2197-2208, 2004.

[35] B. Movassaghi, V. Rasche, M. Grass, M. A. Viergever, and W. J. Niessen, "A Quantitative Analysis of 3-D Coronary Modeling from Two or More Projection Images," *IEEE Transactions on Medical Imaging*, vol. 23, no. 12, pp. 1517-1531, 2004.
[36] R. Liao, D. Luc, Y. Sun, and K. Kirchberg, "3-D Reconstruction of the Coronary Artery Tree from Multiple Views of a Rotational X-Ray Angiography," *The International Journal of Cardiovascular Imaging*, vol. 26, no. 7, pp. 733-749, 2010.
[37] Y. Boykov, O. Veksler, and R. Zabih, "Fast Approximate Energy Minimization via Graph Cuts," *IEEE Transactions on Pattern Analysis and Machine Intelligence*, vol. 23, no. 11, pp. 1222-1239, 2001.
[38] F. Mourgues, F. Devernay, G. Malandain, and E. Coste-Manière, "3D+t Modeling of Coronary Artery Tree from Standard Non Simultaneous Angiograms," in *Proceedings of the 4th International Conference on Medical Image Computing and Computer-Assisted Intervention (MICCAI)*, 2001, pp. 1320-1322.
[39] G. Shechter, F. Devernay, E. Coste-Manière, A. Quyyumi, and E. R. McVeigh, "Three-Dimensional Motion Tracking of Coronary Arteries in Biplane Cineangiograms," *IEEE Transactions on Medical Imaging*, vol. 22, no. 4, pp. 493-503, 2003.
[40] G. Shechter, B. Shechter, J. R. Resar, and R. Beyar, "Prospective Motion Correction of X-Ray Images for Coronary Interventions," *IEEE Transactions on Medical Imaging*, vol. 24, no. 4, pp. 441-450, 2005.
[41] P. Fallavollita and F. Cheriet, "Optimal 3D Reconstruction of Coronary Arteries for 3D Clinical Assessment," *Computerized Medical Imaging and Graphics*, vol. 32, pp. 476-487, 2008.
[42] P. H. S. Torr and D. W. Murray, "The Development and Comparison of Robust Methods for Estimating the Fundamental Matrix," *International Journal of Computer Vision*, vol. 24, no. 3, pp. 271-300, 1997.
[43] G. Li and S. W. Zucker, "Contextual Inference in Contour-Based Stereo Correspondence," *International Journal of Computer Vision*, vol. 69, no. 1, pp. 59-75, 2006.
[44] J. Yang, Y. Wang, Y. Liu, S. Tang, and W. Chen, "Novel Approach for 3-D Reconstruction of Coronary Arteries from Two Uncalibrated Angiographic Images," *IEEE Transactions on Image Processing*, vol. 18, no. 7, pp. 1563-1572, 2009.
[45] R. Cardenes, A. Novikov, J. Gunn, R. Hose, and A. F. Frangi, "3D Reconstruction of Coronary Arteries from Rotational X-Ray Angiography," in *Proceedings of the 9th IEEE International Symposium on Biomedical Imaging (ISBI)*, 2012, pp. 618-621.
[46] M. Li, H. Yang, and H. Kudo, "An Accurate Iterative Reconstruction Algorithm for Sparse Objects: Application to 3D Blood Vessel Reconstruction from a Limited Number of Projections," *Physics in Medicine & Biology*, vol. 47, no. 15, pp. 2599-2609, 2002.
[47] S. Zheng, T. Meiying, and S. Jian, "Sequential Reconstruction of Vessel Skeletons from X-Ray Coronary Angiographic Sequences," *Computerized Medical Imaging and Graphics*, vol. 34, no. 5, pp. 333-345, 2010.
[48] F. Galassi, M. Alkhalil, R. Lee, P. Martindale, et al., "3D Reconstruction of Coronary Arteries from 2D Angiographic Projections Using Non-Uniform Rational Basis Splines (NURBS) for Accurate Modelling of Coronary Stenoses," *Plos One*, vol. 13, no. 1, pp. 1-23, 2018.
[49] T. F. Chan and L. A. Vese, "Active Contours Without Edges," *IEEE Transactions on Image Processing*, vol. 10, no. 2, pp. 266-277, 2001.
[50] R. V. Uitert and I. Bitter, "Subvoxel Precise Skeletons of Volumetric Data Based on Fast Marching Methods," *Medical Physics*, vol. 34, no. 2, pp. 627-638, 2007.
[51] B. K. P. Horn, "Closed-Form Solution of Absolute Orientation Using Unit Quaternions," *Journal of the Optical Society of America A*, vol. 4, no. 4, pp. 629-642, 1987.
[52] F. L. Bookstein, "Principal Warps: Thin Plate Splines and the Decomposition of Deformations," *IEEE Transactions on Pattern Analysis and Machine Intelligence*, vol. 11, no. 6, pp. 567-585, 1989.
[53] B. F. Waller, C. M. Orr, J. D. Slack, C. A. Pinkerton, J. V. Tassel, and T. Peters, "Anatomy, Histology, and Pathology of Coronary Arteries: A Review Relevant to New Interventional and Imaging Techniques—Part I," *Clinical Cardiology*, vol. 15, pp. 451-457, 1992.
[54] D. Mumford and J. Shah, "Optimal Approximation by Piecewise Smooth Functions and Associated Variational Problems," *Communications in Pure and Applied Mathematics*, vol. 42, pp. 577-685, 1989.
[55] A. S. Glassner, *Graphics Gems*, Orlando, FL, USA: Academic Press, Inc., 1990.
[56] A. Andriotis, A. Zifan, M. Gavaises, P. Liatsis, I. Pantos, A. Theodorakakos, et al., "A New Method of Three-Dimensional Coronary Artery Reconstruction from X-ray Angiography: Validation Against a Virtual Phantom and Multislice Computed Tomography," *Catheterization and Cardiovascular Interventions*, vol. 71, pp. 28-43, 2008.
[57] A. Iskurt, Y. Becerikli, and K. Mahmutyazicioglu, "A Fast and Automatic Calibration of the Projectory Images for 3D Reconstruction of the Branchy Structures," *Proceedings of the 47th Annual Conference on Information Sciences and Systems (CISS)*, pp. 1-6, 2013.
[58] C. E. Metz and L. E. Fencil, "Determination of Three-Dimensional Structure in Biplane Radiography without Prior Knowledge of the Relationship Between the Two Views: Theory," *Medical Physics*, vol. 16, no. 1, pp. 45-51, 1989.
[59] M. F. Gross and M. H. Friedman, "Dynamics of Coronary Artery Curvature Obtained from Biplane Cineangiograms," *Journal of Biomechanics*, vol. 31, no. 5, pp. 479-484, 1998.
[60] K. R. Hoffmann, A. Wahle, C. Pellot-Barakat, J. Sklansky, and M. Sonka, "Biplane X-ray Angiograms, Intravascular Ultrasound, and 3D Visualization of Coronary Vessels," *The International Journal of Cardiac Imaging*, vol. 15, no. 6, pp. 495-512, 1999.
[61]
[62] R. Shekhar, R. M. Cothren, D. G. Vince, and J. F. Cornhill, "Fusion of Intravascular Ultrasound and Biplane Angiography for Three-Dimensional Reconstruction of Coronary Arteries," *Proceeding of the Computers in Cardiology*, pp. 5-8, 1996.
[63] P.-A. Dorsaz, P.-A. Doriot, L. Dorsaz, P. Chatelain, and W. Rutishauser, "A New Densitometric Approach to the Assessment of Mean Coronary Flow," *Investigative Radiology*, vol. 32, no. 4, pp. 198-204, 1997.
[64] N. Guggenheim, F. Chappuis, C. Suilen, P. A. Doriot, P. A. Dorsaz, P. Descouts, and W. Rutishauser, "3D-Reconstruction of Coronary Arteries in view of Flow Measurement," *The International Journal of Cardiac Imaging*, vol. 8, no. 4, pp. 265-272, 1992.

The invention claimed is:

1. A method of producing a 3D centerline of an organ vessel from a plurality of 2D images of an organ comprising the organ vessel, the plurality of 2D images having been produced from one or more x-ray sources, the plurality of 2D images being of the organ in different projection planes, and the plurality of 2D images having been pre-processed to identify 2D vessel centerlines, the method comprising the Steps:
- (A) producing a point-cloud of 3D points which comprises:
  - (i) a first set of points which represent the intersection points between
    - (a) projection lines from a plurality of points on a 2D vessel centerline from a first 2D image to the first x-ray source, and
    - (b) projection lines from a plurality of points on a 2D vessel centerline from a second 2D image to the second x-ray source; and
  - (ii) a second set of points which represent nearest orthogonal points between projection lines defined in (a) and projection lines defined in (b) if the projection lines defined in (a) and the projection lines defined in (b) do not intersect;
- (B) fitting a compound curve to the points in the point-cloud of 3D points, the curve having a defined number of breakpoints;
- (C) removing outliers from the point-cloud;
- (D) fitting a new compound curve to the remaining points in the point-cloud of 3D points, the new compound curve having an increased number of breakpoints compared to the previous compound curve; and
- (E) repeating Steps (C) and (D) one or more times;

wherein the resultant compound curve represents the 3D centerline of the organ vessel.

2. The method as claimed in claim 1, wherein the organ is a heart, brain, liver, pancreas, spleen, lung, or kidney.

3. The method as claimed in claim 1, wherein the vessel is an artery, vein, capillary, or sinus.

4. The method as claimed in claim 1, wherein the point-cloud of 3D points comprises:
- (i) a first set of points which represent the intersection points between
  - (a) projection lines from a plurality of points on a 2D vessel centerline from a first 2D image to the first x-ray source,
  - (b) projection lines from a plurality of points on a 2D vessel centerline from a second 2D image to the second x-ray source,
  - (c) projection lines from a plurality of points on a 2D vessel centerline from a third 2D image to the third x-ray source, and optionally
  - (d) projection lines from a plurality of points on a 2D vessel centerline from a fourth 2D image to the fourth x-ray source; and
- (ii) a second set of points which represent nearest orthogonal points between projection lines defined in (a), (b), (c), and optionally (d), if the projection lines do not intersect.

5. The method as claimed in claim 1, wherein the method includes the Step of pre-processing the plurality of 2D images in order to identify the 2D vessel centerlines.

6. The method as claimed in claim 1, wherein the effects of rigid motion are removed prior to Step (A).

7. The method as claimed in claim 6, wherein the effects of rigid motion are removed by:
- (i) selecting a plurality of vessel landmarks from all projection planes;
- (ii) estimating the 3D landmark locations as the point of intersection of 3D projection lines connecting the vessel landmarks on projection planes with the X-ray source;
- (iii) estimating the optimal rigid transformation (translation and/or rotation) from each plane such that the back-projected 3D landmarks on the transformed projection planes match with the corresponding landmarks on 2D image planes;
- (iv) repeating Steps (ii) and (iii) until convergence or the maximum number of iterations have been reached; and
- (v) returning the optimal rigid transformation that minimises the effect of rigid motion.

8. The method as claimed in claim 1, wherein the effects of non-rigid motion are removed prior to Step (A).

9. The method as claimed in claim 8, wherein the effects of non-rigid motion are removed by:
- (i) estimating the warping function from each projection plane, which transforms the selected 2D vessel landmarks to the rigid motion corrected 2D landmark locations (i.e. back-projected 3D landmarks on the transformed projection planes);
- (ii) applying the warping function for each projection plane to the 2D centerline in those projection planes;
- (iii) returning the warped 2D centerlines as the non-rigid motion corrected centerlines.

10. The method as claimed in claim 1, wherein in Step (A), points are not included in the second set of points which comprise orthogonal points between non-intersecting projection lines defined in (a) and (b) if, when the orthogonal distances between all non-intersecting points are ranked in increasing size order, the position of the orthogonal distance in the ranking is lower than a set rank.

11. The method as claimed in claim 1, wherein in Step (B), the compound curve is a B-spline, or a cubic-B-spline.

12. The method as claimed in claim 1, wherein in Step (B), the defined number of breakpoints is 20-40, or 20-30.

13. The method as claimed in claim 1, wherein in Step (C), the outliers are ones wherein the orthogonal distance between the point and the compound curve is greater than a set distance, or greater than 2-5 times the average of the Euclidean distances of the points on the 3D compound curve to the points in the point-cloud that are orthogonal to the curve at that point.

14. The method as claimed in claim 1, wherein in Step (E), Steps (C) and (D) are repeated 2-6, or 3, 4, or 5 times.

15. The method as claimed in claim 1, which additionally comprises the Steps:
- (F) back-projecting the resultant compound curve representing the 3D centerline of the organ vessel onto the first and second 2D images;
- (G) comparing segments of the back-projected compound curve to the corresponding segments of the 2D centerlines in the first and second images by determining the degree of point-to-point correspondences between a plurality of points on each of the segments of the back-projected compound curve and the corresponding points on the segments of the 2D centerlines in the first and second images;
- (H) generating a further point-cloud of 3D points which comprises:
  - (i) for segments with high degrees of point-to-point correspondences between the plurality of points on the segments of the back-projected compound curve and the corresponding points on the segments of the 2D centerlines in the first and second images,
    a first set of points which represent the intersection points between
    - (a) projection lines from the plurality of points on those segments in the first 2D image to the first x-ray source, and (b) projection lines from the corresponding points on the corresponding segments in the second 2D image to the second x-ray source; and
(ii) for segments with low degrees of point-to-point correspondences between the plurality of points on the segments of the back-projected compound curve and the corresponding points on the segments of the 2D centerlines in the first and second images,
a second set of points which represent the intersection points between
(a) projection lines from the plurality of points on those segments in the first 2D image to the first x-ray source, and
(b) projection lines from the plurality of points on the corresponding segments in the second 2D image to the second x-ray source;
a third set of points which represent the nearest orthogonal points between projection lines defined in (a) and (b) if the projection lines defined in (a) and (b) do not intersect;
(I) fitting a compound curve to the points in the further point-cloud of 3D points, the compound curve having a defined number of breakpoints;
(J) removing outliers from the point-cloud of 3D points;
(K) fitting a new compound curve to the remaining points in the point-cloud of 3D points, the new compound curve having an increased number of breakpoints compared to the previous compound curve; and
(L) repeating Steps (J) and (K) one or more times;
wherein the resultant compound curve represents the 3D centerline of the organ vessel.

16. The method as claimed in claim 15, wherein Steps (F) to (L) are repeated one or more times.

17. The method as claimed in claim 1, wherein luminal cross-sections along the centerlines are generated, or wherein luminal cross-sections along the centerlines are generated using a non-uniform
rational basis splines (NURBS) method.

18. The method as claimed in claim 1, wherein lumen surface of the vessel is generated, or wherein a lumen surface of the vessel is generated using a non-uniform rational basis splines (NURBS) surface model.

19. A system or apparatus comprising at least one processing means arranged to carry out the Steps of the method as claimed in claim 1.

20. A carrier comprising a non-transitory computer readable medium for bearing software comprising instructions for configuring a processor to carry out the Steps of the method as claimed in claim 1.

* * * * *